(12) United States Patent (10) Patent No.: US 8,301,569 B2
Kawamoto et al. (45) Date of Patent: Oct. 30, 2012

(54) CONTENT INFORMATION PROVIDING SYSTEM, CONTENT INFORMATION PROVIDING SERVER, CONTENT REPRODUCTION APPARATUS, CONTENT INFORMATION PROVIDING METHOD, CONTENT REPRODUCTION METHOD AND COMPUTER PROGRAM

(75) Inventors: Yoji Kawamoto, Tokyo (JP); Yutaka Nagao, Chiba (JP); Seiichi Adachi, Kanagawa (JP); Atsushi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/763,371

(22) Filed: Apr. 20, 2010

(65) Prior Publication Data

US 2010/0205677 A1 Aug. 12, 2010

Related U.S. Application Data

(63) Continuation of application No. 11/278,057, filed on Mar. 30, 2006, now Pat. No. 7,933,837.

(30) Foreign Application Priority Data

Mar. 31, 2005 (JP) ................................ P2005-104314

(51) Int. Cl.
*G06F 21/00* (2006.01)

(52) U.S. Cl. ............... 705/52; 705/50; 705/51; 713/193

(58) Field of Classification Search ................ 705/52, 705/50, 51; 713/193
See application file for complete search history.

(56) References Cited

U.S. PATENT DOCUMENTS

| 2002/0013772 | A1 | 1/2002 | Peinado | |
|---|---|---|---|---|
| 2002/0026581 | A1* | 2/2002 | Matsuyama et al. | 713/168 |
| 2002/0026582 | A1* | 2/2002 | Futamura et al. | 713/170 |
| 2002/0053090 | A1 | 5/2002 | Okayama et al. | |
| 2002/0114461 | A1* | 8/2002 | Shimada et al. | 380/201 |
| 2002/0184515 | A1 | 12/2002 | Oho et al. | |
| 2004/0172533 | A1 | 9/2004 | DeMeilo et al. | |

(Continued)

FOREIGN PATENT DOCUMENTS

JP 1 128 598 8/2001

(Continued)

OTHER PUBLICATIONS

European Office Action issued on Sep. 18, 2009, for corresponding European Patent Application 06006594.3-1245.

(Continued)

*Primary Examiner* — Pierre E Elisca

(74) *Attorney, Agent, or Firm* — K&L Gates LLP

(57) ABSTRACT

A content information providing system is disclosed which can protect the copyrights of contents while permitting users who do not purchase the contents to utilize the contents. A content information providing server includes a user information storage section for storing a user key unique to each user, a content key storage section for storing content keys unique to individual contents, a recommendation section for selecting a content to be recommended to the user, a content key encryption section for encrypting the selected content key with a user key of the user of a target of the recommendation, and a content information sender section for transmitting the encrypted content key to a content reproduction apparatus used by the user. The content reproduction apparatus includes a content information receiver section for receiving the content key, and a content key decryption section for decrypting the encrypted content key.

7 Claims, 21 Drawing Sheets

U.S. PATENT DOCUMENTS

| | | |
|---|---|---|
| 2005/0027871 A1 | 2/2005 | Bradley et al. |
| 2005/0050345 A1 | 3/2005 | Dowdy et al. |
| 2005/0203991 A1* | 9/2005 | Kawamura et al. ............ 709/203 |
| 2005/0234828 A1* | 10/2005 | Matsuyama et al. ............ 705/51 |
| 2005/0240587 A1 | 10/2005 | Asami et al. |
| 2006/0080539 A1* | 4/2006 | Asami et al. .................. 713/182 |
| 2007/0025704 A1* | 2/2007 | Tsukazaki et al. .............. 386/96 |
| 2008/0288410 A1* | 11/2008 | Nino ................................ 705/52 |
| 2010/0023980 A1* | 1/2010 | Yamagishi et al. ............ 725/104 |
| 2010/0281178 A1* | 11/2010 | Sullivan ........................ 709/231 |
| 2011/0149156 A1* | 6/2011 | Tokumo et al. ............... 348/474 |

FOREIGN PATENT DOCUMENTS

| | | |
|---|---|---|
| JP | 2002-341876 | 11/2002 |
| JP | 2003-115017 | 4/2003 |
| JP | 2006-524972 | 2/2006 |
| JP | 2007-526526 | 9/2007 |

OTHER PUBLICATIONS

Japanese Office Action issued on Jan. 5, 2010, for corresponding JP2005-104314.

* cited by examiner

F I G. 6

| USER ID | CREDIT CARD NUMBER | USER KEY | DEVICE ID | DEVICE KEY | LINK |
|---|---|---|---|---|---|
| Yamada Taro | XXX-XXXX | USER KEY A | DEVICE ID 1 | DEVICE KEY 1 | LINK A |
| | | | DEVICE ID 2 | DEVICE KEY 2 | LINK B, LINK C |
| | | | DEVICE ID 3 | DEVICE KEY 3 | LINK D |
| Suzuki Jiro | XXX-XXXX | USER KEY B | DEVICE ID 4 | DEVICE KEY 4 | LINK E |
| | | | DEVICE ID 5 | DEVICE KEY 5 | LINK F |
| | | | DEVICE ID 6 | DEVICE KEY 6 | LINK G |
| | | | DEVICE ID 7 | DEVICE KEY 7 | LINK H |
| ... | ... | ... | ... | ... | ... |

3121, 3122, 3123, 3124, 3125, 3126

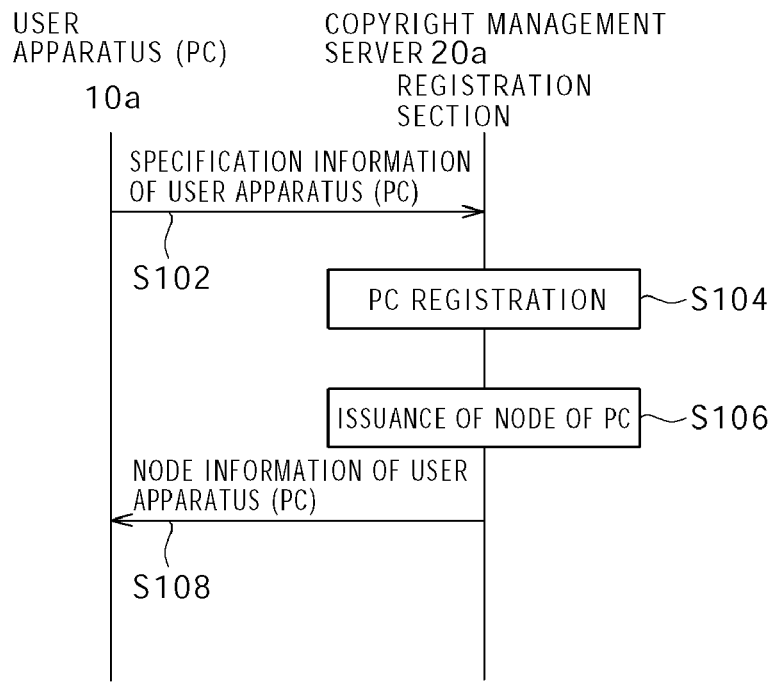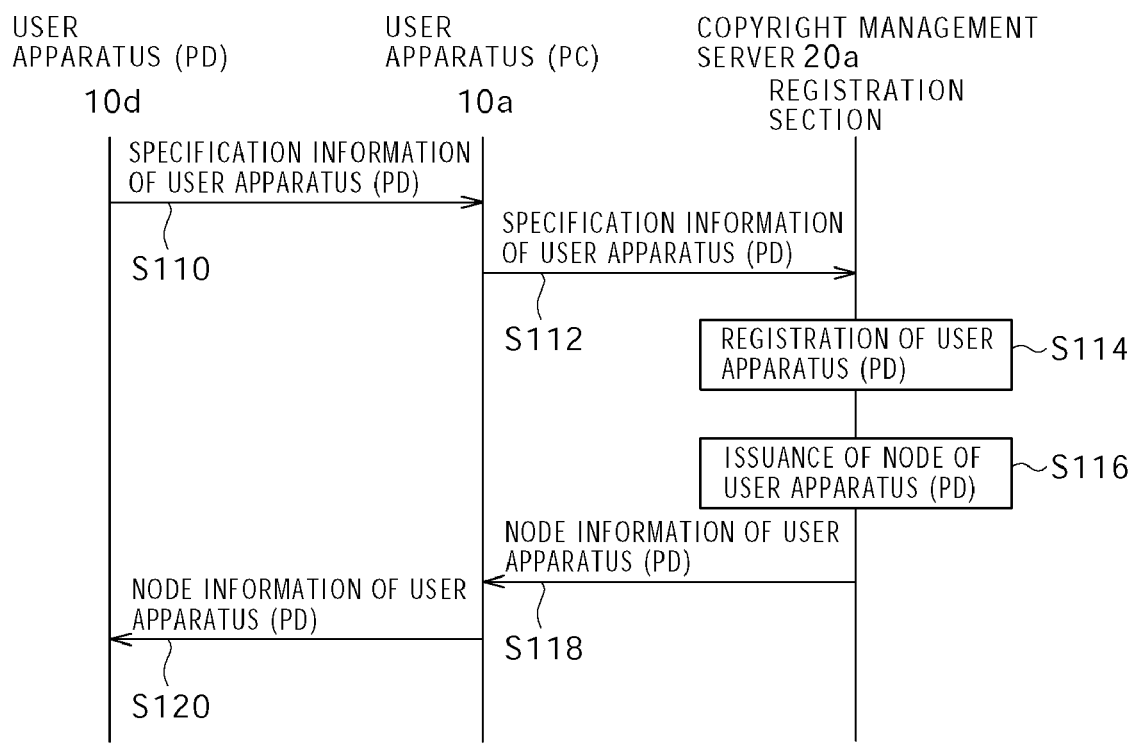

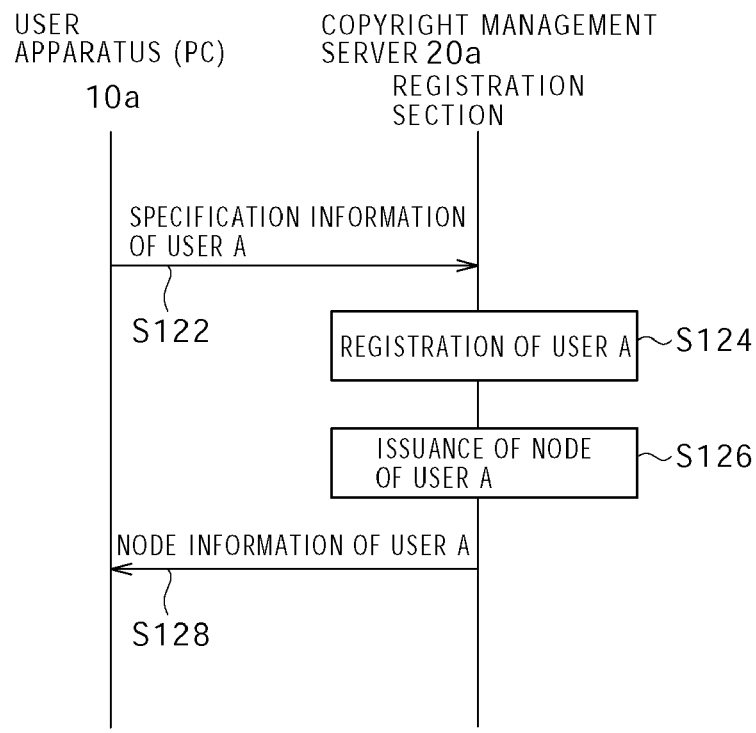
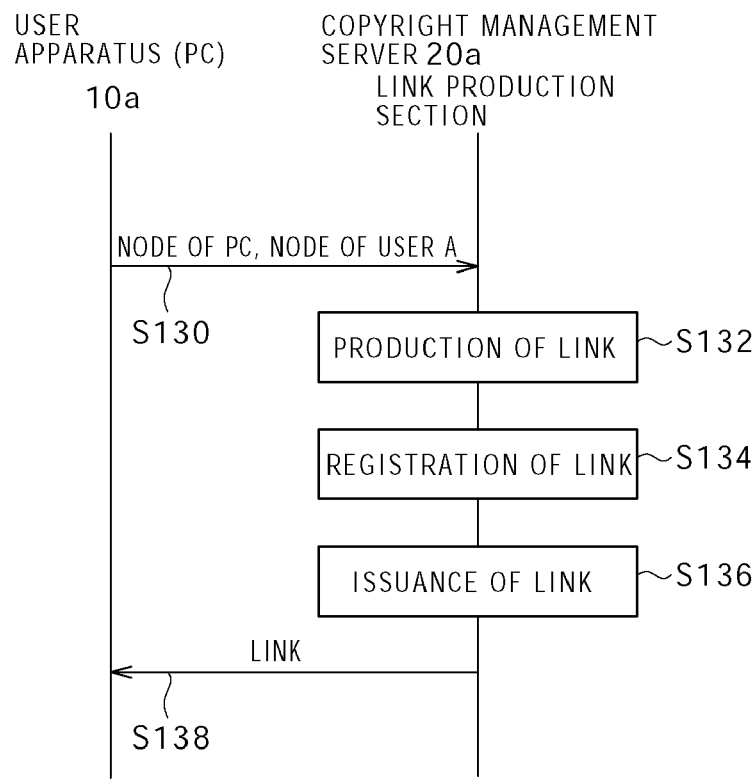

| USER ID (3121) | GENRE (530) | ARTIST NAME (532) | TEMPO (534) | ... |
|---|---|---|---|---|
| Yamada Taro | POPS<br>JAZZ | ARTIST NAME 1<br>ARTIST NAME 2 | HIGH | |
| Suzuki Jiro | POPS | ARTIST NAME 3 | HIGH | |
| Tanaka Ai | SENTIMENTAL POPULAR SONG | ARTIST NAME 4 | LOW | |
| ⋮ | ⋮ | ⋮ | ⋮ | |

| CONTENT ID (540) | GENRE (530) | ARTIST NAME (532) | TEMPO (534) | ... |
|---|---|---|---|---|
| C0001 | POPS | ARTIST NAME 1 | HIGH | ... |
| C0002 | POPS | ARTIST NAME 3 | HIGH | ... |
| C0003 | JAZZ | ARTIST NAME 2 | MEDIUM | ... |
| C0004 | SENTIMENTAL POPULAR SONG | ARTIST NAME 4 | LOW | ... |
| C0005 | JAZZ | ARTIST NAME 5 | HIGH | ... |
| ⋮ | ⋮ | ⋮ | ⋮ | |

CONTENT INFORMATION PROVIDING SYSTEM, CONTENT INFORMATION PROVIDING SERVER, CONTENT REPRODUCTION APPARATUS, CONTENT INFORMATION PROVIDING METHOD, CONTENT REPRODUCTION METHOD AND COMPUTER PROGRAM

CROSS REFERENCES TO RELATED APPLICATIONS

The present application is a continuation of U.S. patent application Ser. No. 11/278,057 filed Mar. 30, 2006, which claims priority to Japanese Patent Application P2005-104314 filed in the Japanese Patent Office on Mar. 31, 2005 the entire contents of which being incorporated herein by reference.

BACKGROUND

This invention relates to a content information providing system, and more particularly to a system for providing a content key to a content reproduction apparatus which decrypts and reproduces a content encrypted with the content key.

A content providing service in related art is available wherein a digital content such as a music content, a video content or the like is downloaded to an information terminal such as a PC (Personal Computer) or a PDA (Personal Digital Assistant) used by a user from a server in which the content is stored and is utilized on the information terminal. In such a content providing service as just described, in order for a user to utilize a content, the user must perform an accounting process for the server or the like described above and purchase a license corresponding to the content.

However, it is convenient for the user if trial listening or trial viewing of a content can be performed before the license of the content is purchased actually. Therefore, an information transmission and reception system has been proposed which allows trial listening of a content before a license for the content is purchased (for example, refer to Japanese Patent Laid-Open No. 2002-341876). In the information transmission and reception system of Japanese Patent Laid-Open No. 2002-341876, additional information is superposed on a content for sale to produce a content for trial listening separate from the content for sale such that reproduction in the form same as that of the content for sale cannot be fully performed, and the content for trial listening is distributed free of charge to the user. Consequently, it is possible for the user to perform, before the user actually buys a content, trial listening of the content for trial listening corresponding to the content. With the system described, since the user can use a content for trial listening different from that for sale, the convenience to the user can be secured and the copyright of the content can be protected.

SUMMARY

However, the information transmission and reception system described above has a subject to be solved that a content for trial listening must be produced separately from a content for sale.

It is desirable to provide a content information providing system, a content information providing server, a content reproduction apparatus, a content information providing method, a content reproduction method and a computer program which can protect the copyrights of contents while permitting users who do not purchase the contents to utilize the contents.

According to an embodiment of the present invention, there is provided a content information providing system including a content information providing server, and a content reproduction apparatus for acquiring a content key from the content information providing server and decrypting and reproducing an encrypted content with the content key, the content information providing server including a user information storage section for storing identification information of a user who uses the content reproduction apparatus and a user key unique to the user in an associated relationship with each other, a content key storage section for storing identification information of contents and content keys unique to the individual contents in an associated relationship with each other, a recommendation section for selecting a content to be recommended to the user, a content key encryption section for acquiring the content key of the content selected by the recommendation section from the content key storage section and acquiring the user key of the user who is a target of the recommendation from the user information storage section and for encrypting the acquired content key with the acquired user key, and a content information sender section for transmitting content information including the content key encrypted with the user key to the content reproduction apparatus used by the user who is a target of the recommendation, the content reproduction apparatus including a content information receiver section for receiving the content information including the encrypted content key, and a content key decryption section for decrypting the encrypted content key.

With the content information providing system, since a content is provided in an encrypted state to a content reproduction apparatus of the user, if the content is not decrypted, then the content reproduction apparatus cannot reproduce the content. In order to decrypt the content, a content key used to encrypt the content is required. The content key used to encrypt the content is provided in a form encrypted by the content information providing server with a user key unique to a predetermined user, who is a target of recommendation, to the content reproduction apparatus. Therefore, only the content reproduction apparatus which can decrypt the content key encrypted with the predetermined user key can decrypt the content key and can decrypt the content with the decrypted content key. In other words, restrictions can be provided so that only the user designated as a target of recommendation by the content information providing server can utilize the content. Further, the content key used to encrypt the content is unique to each content. Therefore, even if one content key is decrypted, only a content corresponding to the decrypted content key can be decrypted with the decrypted content key. In other words, restrictions can be provided so that only a content selected by the content information providing server is utilized only by a predetermined user.

A content to be recommended is a content which is recommended to a user by the content information providing server.

Encryption is rearrangement of digital information using a cryptographic key. A content key, a user key and a device key described below are function as cryptographic keys. The cryptographic keys are used as a predetermined rule used for rearrangement of digital information. Two encryption methods are available including a public key encryption method wherein a key used for encryption and a key used for decryption are different from each other and a private key encryption method wherein a key used for encryption and a key used for decryption are same as each other. Both of the methods can be applied in the present invention. It is to be noted that, in the present document, both of a key for encrypting a content and a key for decrypting a content are hereinafter referred to as content key. Further, a user key is given to a user who utilizes the content information providing system and includes both of the key for encryption and the key for decryption.

According to another embodiment of the present invention, there is provided a content reproduction apparatus for acquiring a content key from a content information providing server and decrypting and reproducing an encrypted content with the content key, including a content information receiver section for receiving content information including a content key unique to a content to be recommended to a user who is a target of the recommendation and encrypted with a user key unique to the user from the content information providing server, and a content key decryption section for decrypting the encrypted content key.

In the content reproduction apparatus, it receives a content key for decrypting an encrypted content from the content information providing server through the content information receiving section. The content key is in a form encrypted with a user key unique to a predetermined user designated by the content information providing server. The content reproduction apparatus decrypts the encrypted content key by means of the content key decryption section. Then, the content reproduction apparatus can decrypt and reproduce the content using the decrypted content key. In particular, if the user key unique to the user who is a target of recommendation can be utilized, then the content reproduction apparatus can reproduce the content corresponding to the content key received by the content information receiving section. On the other hand, if the content reproduction apparatus cannot utilize the user key unique to the user who is a target of recommendation, then it cannot reproduce the encrypted content. Where the content reproduction apparatus which can reproduce a content is restricted in this manner, the copyright of the content can be protected. It is to be noted that to protect the copyright of a content is to prevent utilization of the content by a third party who does not have the utilization right of the content and prevent utilization of the content by a user who has a utilization right of the content exceeding the authorized limit of rights.

The content reproduction apparatus may be configured such that the content information includes utilization restriction information for the content, and the content reproduction apparatus further includes a reproduction control section for restricting reproduction of the content in accordance with the utilization restriction information for the content. In the content reproduction apparatus, even if the content reproduction apparatus can utilize a user key unique to a user who is a target of recommendation and can reproduce a content corresponding to a content key received by the content information receiving section, reproduction of the content is restricted in accordance with utilization limitation information. Since free reproduction of the content by the content reproduction apparatus is restricted in this manner, the copyright of the content can be protected further effectively.

The content information may include meta information of the content to be recommended to the user. In the content reproduction apparatus, when it receives content information, it can utilize the meta information to issue a notification of information of a recommended content to the user in a form wherein the user can recognize it.

The content information may be produced by the content information providing server. In this instance, the content information providing server may select the content to be recommended to the user who is a target of the recommendation based on information of a liking of the user and encrypt a content key for the selected content using a user key of the user and then produce content information including meta information of the selected content, the encrypted content key and utilization restriction information for the content.

The content reproduction apparatus may further include a link information storage section for storing identification information of the content reproduction apparatus and identification information of the user who uses the content reproduction apparatus in an associated relationship with each other, the content key decryption section successfully decrypting the encrypted content key where the identification information of the user stored in the link information storage section and the identification information of the user who is the target of the recommendation correspond to each other. In the content reproduction apparatus, only in a case wherein identification information corresponding to identification information of a user who is a target of recommendation is stored in the link information storage section, the content reproduction apparatus can successfully decrypt the content key and can reproduce the content. In other words, restrictions can be provided so that a content can be reproduced only by the content reproduction apparatus which is used by a predetermined user designated by the content information providing server.

The content reproduction apparatus may be configured such that the link information storage section stores a user key unique to the user who uses the content reproduction apparatus, and the content reproduction apparatus further includes a key processing section for decrypting the encrypted user key using a device key unique to the content reproduction apparatus, the content key decryption section decrypting the encrypted content key with the user key decrypted by the key processing section.

The content reproduction apparatus may be configured such that the link information storage section stores at least one piece of link information acquired from the content providing server and establishes an associated relationship between the identification information of the content reproduction apparatus and the identification information of the user who uses the content reproduction apparatus by producing a route whose starting point is the content reproduction apparatus identified based on the identification information and whose arriving point is the user identified by the identification information in accordance with the stored link information, the link information including a pair of pieces of identification information one of which indicates a link source and the other of which indicates a link destination, the identification information being used as identification information for allowing the content information providing server to uniquely identify the user or as identification information for allowing the content information providing server to uniquely identify the content reproduction apparatus.

The content reproduction apparatus may be configured such that the content information includes the identification information of the user who is a target of the recommendation, the content reproduction apparatus further including a decision section for permitting, where the identification information of the user included in the content information and the identification information of the user stored in the link information storage section correspond to each other, the content key decryption section to decrypt the content key. In the content reproduction apparatus, since decryption is permitted only in a case wherein the content key decryption section successfully decrypts a content key, a uselessness process, that is, a decryption process which does not result in success, can be prevented from being performed by the content key decryption section.

The content reproduction apparatus may be configured such that the content key is encrypted with the device key unique to the content reproduction apparatus which receives the content information in place of the content key encrypted with the user key unique to the user who is a target of the recommendation and the encrypted content key is included in the content information, and the content key decryption section decrypts the content key encrypted with the device key unique to the content reproduction apparatus. In the content reproduction apparatus, even if the content reproduction apparatus can utilize a user key unique to a user who is a target of recommendation is used, if a device key unique to the content reproduction apparatus which receives content information is not utilized, then the content reproduction apparatus cannot reproduce the content. In other words, the content reproduction apparatus which can reproduce a content can be restricted further when compared with an alternative case wherein a content key is encrypted with a user key.

It is to be noted that the functions of the content reproduction apparatus may be provided in one computer or may be individually provided to a plurality of computers which cooperatively function as one content reproduction apparatus.

According to a further embodiment of the present invention, a computer program for causing a computer to function as such a content reproduction apparatus as described above and a computer-readable recording medium on which the computer program is recorded are provided.

According to a still further embodiment of the present invention, a content reproduction method is provided.

According to a yet further embodiment of the present invention, there is provided a content information providing server for providing a content key to a content reproduction apparatus which decrypts and reproduces an encrypted content with the content key, including a user information storage section for storing identification information of a user who uses the content reproduction apparatus and a user key unique to the user in an associated relationship with each other, a content key storage section for storing identification information of contents and content keys unique to the individual contents in an associated relationship with each other, a recommendation section for selecting a content to be recommended to the user, a content key encryption section for acquiring the content key of the content selected by the recommendation section from the content key storage section and acquiring the user key of the user who is a target of the recommendation from the user information storage section and for encrypting the acquired content key with the acquired user key, and a content information sender section for transmitting content information including the content key encrypted with the user key to the content reproduction apparatus used by the user who is a target of the recommendation.

In the content information providing server, it can provide content information to the content reproduction apparatus such that only a content selected by the recommendation section can be utilized by a user who is a target of recommendation.

According to an additional embodiment of the present invention, a computer program for causing a computer to function as such a content information providing server as described above and a computer-readable recording medium on which the computer program is recorded are provided.

According to a still further embodiment of the present invention, a content information providing method is provided.

With the content information providing system, content reproduction apparatus, content reproduction method, computer programs, content information providing server and content information providing method, the copyrights of contents can be protected while users who do not purchase the contents are permitted to utilize the contents.

The above and other objects, features and advantages of the present invention will become apparent from the following description and the appended claims, taken in conjunction with the accompanying drawings in which like parts or elements denoted by like reference symbols.

Additional features and advantages are described herein, and will be apparent from, the following Detailed Description and the figures.

BRIEF DESCRIPTION OF THE FIGURES

FIG. 6 is a view illustrating the stored substance of a user information storage section shown in FIG. 5.

FIG. 7 is a timing chart illustrating a registration process of the PC shown in FIG. 1.

FIG. 8 is a timing chart illustrating a registration process of the PD shown in FIG. 1.

FIG. 9 is a timing chart illustrating a registration process of a user in the content providing system of FIG. 1.

FIG. 10 is a timing chart illustrating a link process of the content providing system of FIG. 1.

FIG. 19 is a view illustrating the stored substance of a user liking information storage section shown in FIG. 18.

FIG. 20 is a view illustrating the stored substance of a content information storage section shown in FIG. 18.

DETAILED DESCRIPTION

Figure 1:
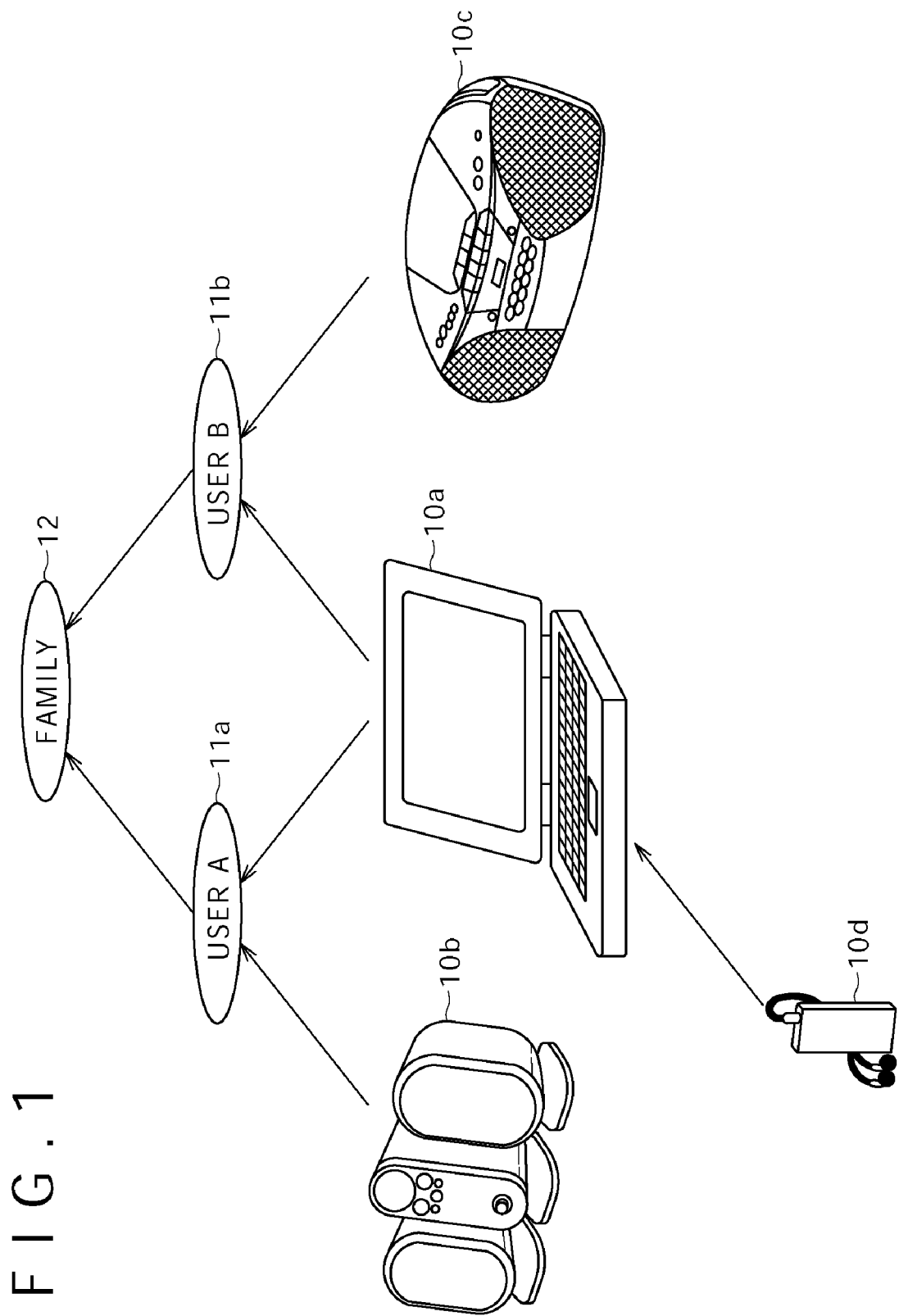
FIG. 1 is a schematic view showing an outline of a link system of a content providing system in which a content information providing system according to the present invention is applied and illustrating copyright management of the link system.

In the following, a content information providing system according to the present invention is described which is applied to a content information providing system 500 wherein utilization of a content can be permitted to a user under a predetermined condition to protect the copyrights of contents while achieving sales promotion of contents.

The content may be an arbitrary content such as, for example, a sound (Audio) content of music, a lecture, a radio program or the like, an image (Video) content formed from a still picture or pictures or moving pictures which form a movie, a television program, a video program, a photograph, a painting, a chart or the like, an electronic book (E-book), a game or software. In the following description, a sound content, particularly a music content distributed from a distribution server or ripped from a music CD, is described as an example of a content. However, the present invention is not limited to such an example as just mentioned.

While utilization of a content under a predetermined condition is sometimes called trial use of a content, since a music content is utilized as a content in the present embodiment, utilization of a content is hereinafter referred to as trial listening. The trial listening of a content is useful for sales promotion of pay contents. Therefore, a distribution service provider who performs a distribution service of pay contents usually allows a user to perform trial listening of a content in order to promote sales of pay contents. While the distribution service provider permits trial listening to attempt sales promotion of contents, it must protect the copyright of contents. Therefore, an example of a method wherein a service of trial listening is performed while the copyright is protected is described for comparison with the content information providing system 500 according to the present embodiment.

The following three methods are available for a trial listening service.

(1) A content whose trial listening is to be permitted is not encrypted so that anyone can utilize it. In this instance, a content for sales cannot be used from the point of view of the copyright protection and also of sales promotion. Therefore, as a content for trial listening, a content whose sound quality is lower than that of a content for sales or a content whose reproduction is permitted only at part thereof is produced separately from the content for sales.

(2) All contents whose trial listening is to be permitted are encrypted with the same content key so that only those users who acquire the content key can utilize all contents. Usually, each of contents for sales is encrypted with a content key unique to the content. Therefore, a distribution service provider must prepare and reserve, in addition to contents for sales encrypted with individually unique content keys, contents encrypted with a key common to all contents as contents for trial listening. Further, in this instance, if the content key leaks to a third party who does not have the right for listening, then the third party can utilize all contents. Therefore, it is difficult to use contents for sales as contents for trial listening from the point of view not only of the copyright protection but also of sales promotion, and contents for trial listening must be produced separately from contents for sales.

(3) Contents whose trial listening is to be permitted are encrypted with content keys which are different among different contents such that only a user who acquires any of the content keys can utilize only a content corresponding to the acquired content key. In this instance, if a content key is distributed in safety to a user who has the right for trial listening of a content corresponding to the content key, then the distribution service provider can eliminate the problem in regard to copyright protection even if a content for sales encrypted with a content key unique to the content is utilized as a content for trial listening. Therefore, if a content key is distributed in a form encrypted with a user key which is different among different users, then the content key can be distributed in safety to the predetermined user. In other words, even if the content key leaks to a third party who does not have the right for trial listening, the third party cannot decrypt the content key encrypted with the user key and consequently cannot utilize the content. The distribution service provider can implement this method by storing content keys encrypted with user keys of individual users with regard to individual contents. However, where the number of contents or/and users is very great, a large number of content keys must be produced and stored. Further, if a user does not want trial listening, then content keys are not used and come to naught.

Therefore, the content information providing system 500 according to the present embodiment improves the method (3) described above to solve the problem described above. In the following, an outline of the content information providing system 500 is described.

In the present embodiment, a user is registered in the content information providing service provided by the content information providing system 500 and is a utilizing person for whom a user ID identified uniquely in the content information providing service is issued as identification information of the user. In the content information providing service, contents which can be utilized under a predetermined condition by the user and information relating to the contents are provided to the user. The contents are provided in an encrypted form to the user.

Information relating to a content particularly includes meta information of a content to be recommended to a user and information necessary to reproduce the content. The meta information of a content is information for notifying the user of what content the content recommended to the user is, and may include, for example, a genre of a content (genre of music), a title name, a name of an artist and so forth. The information necessary for reproduction of a content is a content key for decrypting the content in an encrypted form. The content key is unique to each content. The content key is encrypted with a user key unique to each user and provided to the user. In this instance, only after the content is specified and the user to whom the content is to be provided are specified, the content key unique to the content can be encrypted with the user key unique to the user. In the content information providing system 500 according to the present embodiment, in order to recommend a content to a user, when the content to be recommended is determined, the user of a target of recommendation and the content to be recommended can be specified and encryption of the content key can be performed. Accordingly, there is no necessity to encrypt content keys of all contents with user keys of all users as in the method (3) described hereinabove.

The content information providing service is carried out for sales promotion of pay contents, for example, by a distribution service provider who performs a distribution service of pay contents. In particular, the distribution service provider recommends a content to a user and permits the user to utilize the recommended content under a predetermined condition. In other words, the distribution service provider permits the user to trial listen the recommended content. Since the user can trial listen the recommended content, the user is likely to purchase the content.

The outline of the content information providing system 500 is such as described above. Now, copyright management by the link system adopted by the content information providing system 500 according to the present embodiment is described. In the present system, copyright management of the link system described below is used to protect the copyright of a content whose trial listening is to be permitted to a user.

<1. Outline of the Copyright Management by the Link System>

First, an outline of a content providing system ready for the copyright management by the link system used in the information process distribution system according to the present embodiment is described.

The content providing system manages users and utilization conditions of copyright management contents (hereinafter referred to simply as "contents") obtained by encrypting digital contents of images, sound and so forth. The content providing system restricts utilization of a content by any other user than the user who purchases the content in order to prevent illegal utilization of the content such as an act of mass distribution of the content through the Internet or the like with certainty.

In order for a user who purchases an encrypted content to reproduce the content, it is necessary to decrypt the content with a content encryption processing key (hereinafter referred to as "content key") used to encrypt the content. Even if the content is distributed illegally through the Internet or the like, if the content key is not available, then the content cannot be reproduced. Accordingly, in the content providing system, a content key must be distributed in safety and must be used by a legal user.

On the other hand, between apparatus owned by a user who purchases a content, it is necessary to permit the content to be distributed freely to some degree. Otherwise, the user who purchases the content cannot reproduce the content on an apparatus owned by the user itself or can be reproduced but only by an apparatus together with which the content is purchased.

In this manner, the content providing system adopts a copyright management system wherein, while copyright management is performed, sharing of a content can be permitted within the range of private utilization to enhance the convenience and degree of freedom in content sharing among a plurality of apparatus owned by the same user. In order to implement the copyright management system, in the present embodiment, a copyright management scheme by the link system is adopted.

According to the copyright management by the link system, difference apparatus are associated with each other to make it possible to share a content among the apparatus. In the present embodiment, to associate different apparatus with each other is referred to as to link apparatus (to each other). For example, by linking an apparatus 2 owned by a user to another apparatus 1 owned by the user, it becomes possible to reproduce a content, which can be reproduced on the apparatus 1, also on the apparatus 2. While detailed description of the apparatus is hereinafter given, any apparatus linked to the apparatus 1 which can reproduce a content can reproduce the content, but any apparatus which is not linked to the apparatus 1 cannot reproduce the content. Therefore, while copyright management is performed, a content can be reproduced freely to some degree by any apparatus owned by the user.

It is to be noted that the content may be an arbitrary content such as, for example, a sound (Audio) content of music, a lecture, a radio program or the like, an image (Video) content formed from a still picture or pictures or moving pictures which form a movie, a television program, a video program, a photograph, a painting, a chart or the like, an electronic book (E-book), a game or software. In the following description, a music content, particularly a music content distributed from a distribution server or ripped from a music CD, is described as an example of a content. However, the present invention is not limited to such an example as just mentioned.

Now, an outline of the link system in the content providing system for performing such copyright management of the link system as described above is described with reference to FIG. 1. FIG. 1 shows an outline of the link system of the content providing system.

Referring to FIG. 1, it is assumed that a user A 11a owns user apparatus 10a, 10b and 10d. For example, the user A subscribes for a content providing service through the user apparatus 10a and purchases a content. If the user A wants to reproduce the content on the user apparatus 10a which is an apparatus owned by the user A itself, then the user A would link the user apparatus 10a to the user A. As described hereinabove, if the user apparatus 10a is linked to the user A, then it becomes possible for a content purchased by the user A to be reproduced on the user apparatus 10a.

Here, to link the user apparatus 10a to the user A is that the user apparatus 10a acquires private information of the user A. The private information of the user A is information which can be known originally by the user A and is, for example, information of a private key of the user A. For example, in order to distribute a content key in safety to the user A, the content key is encrypted with a public key or a private key of the user and distributed to the user A.

The user A would try to reproduce a content on the user apparatus 10a. However, if the user apparatus 10a does not have information of the private key of the user A, then the user apparatus 10a cannot decrypt the content key and hence cannot reproduce the content. Therefore, if the user apparatus 10a is linked to the user A, that is, if the user apparatus 10a can acquire the information of the private key of the user A, then the user apparatus 10a can reproduce the content purchased by the user A.

Similarly, the user apparatus 10b would be linked to the user A. If the user apparatus 10b has the information of the private key of the user A, then also the user apparatus 10b can reproduce any content purchased by the user A.

In order for the private key of the user A to be distributed in safety to the user apparatus 10a, it is necessary for the private key of the user A to be encrypted with the public key or the private key of the user apparatus 10a and distributed to the user apparatus 10a. The private key of the user A is decrypted by the user apparatus 10a, and the content key is decrypted with the decrypted private key of the user A. Further, if it is desired to reproduce the content also on the user apparatus 10d, the user apparatus 10d should be linked to the user apparatus 10a. The user apparatus 10d can acquire the information of the private key of the user apparatus 10a and can acquire also the information of the private key of the user A using the private key of the user apparatus 10a. Then, the content purchased by the user A can be reproduced with the private key of the user A.

In this manner, if an apparatus acquires private information of a link destination tracing the destinations of the links to which the apparatus itself is linked, then the apparatus at the link destination can reproduce a content purchased. For example, if the user apparatus 10a is linked to a user B 11b who is a member of a family 12 of the user A, then also a content purchased by the user B can be reproduced on the user apparatus 10a. Further, if the user A and the user B are linked to a different member of the family, then when the member of the family becomes a member of the content providing service and purchases a content, also the user A and the user B can reproduce the content. Then, if any user apparatus is linked to the user A and the user B, then the user apparatus can reproduce the content purchased by the member of the family.

Furthermore, if users and user apparatus owned by the users or user apparatus owned by users are linked to each other, then only if a content key is distributed in safety to any of the users, then it is possible to restrict those users who utilize the content while the content is shared freely to some degree between the apparatus owned by the users.

An outline of the copyright management by the link system is described above. Now, the content providing system 100 as a particular example which implements the copyright management by the link system is described below.

<2. General Configuration of the Content Providing System>

Figure 2:
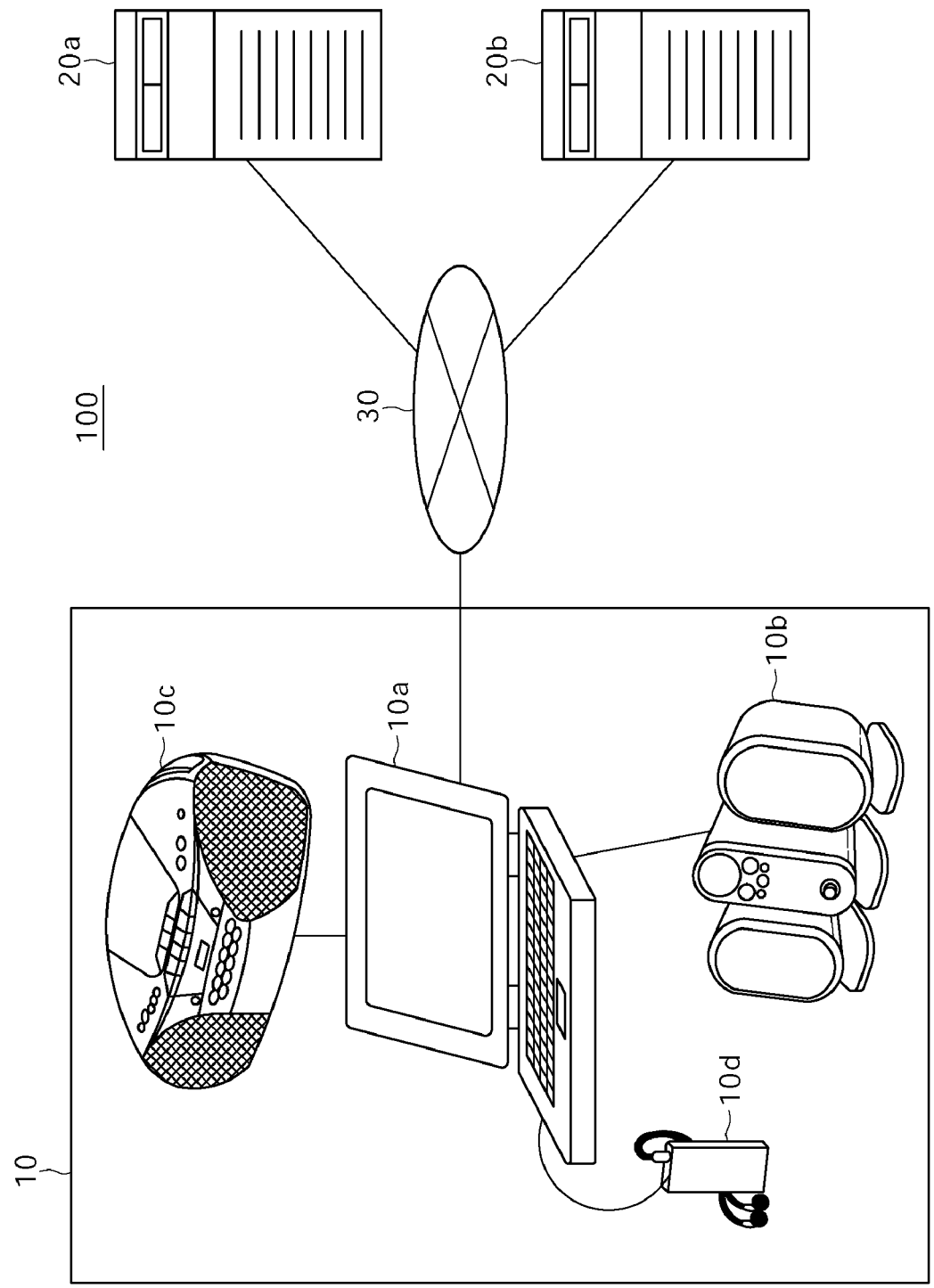
FIG. 2 is a schematic view showing a general configuration of the content providing system of FIG. 1.

FIG. 2 shows a general configuration of the content providing system 100. Referring to FIG. 2, the content providing system 100 shown includes user apparatus 10, a copyright management server 20a, and a content providing server 20b. The user apparatus 10 may include a plurality of user apparatus 10a, 10b, 10c, 10d, . . . as described hereinabove. Further, while the copyright management server 20a and the content providing server 20b are formed as separate servers from each other, they may otherwise be formed as a single synthesized server.

Various information processing apparatus for utilizing a content can be used for the user apparatus 10. In FIG. 2, the user apparatus 10 includes a personal computer (hereinafter referred to sometimes as PC) 10a of the notebook type or the desk top type, audio apparatus 10b and 10c, and a portable device (hereinafter referred to sometimes as PD) 10d which is a content reproduction apparatus of the portable type.

The user apparatus 10 have, for example, utilization functions of a content (for example, reproduction, storage, movement, joining, dividing, conversion, duplication, lending and returning functions of a content), a content reproduction controlling function based on a link described hereinabove, a management function of a content (for example, search and deletion functions of a content based on a content ID, a content key or the like), and a content production function by ripping, self recording and the like.

From among the user apparatus 10, an apparatus (for example, the user apparatus 10a) which has a communication function through a network 30 can be connected for communication to the copyright management server 20a and the content providing server 20b. Any user apparatus 10 of the type described can download and install software for a content distribution service and software for copyright management, for example, from the content providing server 20b. Consequently, the user apparatus 10 can receive an encrypted content distributed from the content providing server 20b or receive a license including a content key for a content, utilization conditions of the content and so forth and distributed from the copyright management server 20a. Further, the user apparatus 10 can record received data into a storage device or a storage element such as a removable storage medium.

Further, the user apparatus 10 can newly produce a content, for example, by self recording (self recording of sound, images or the like) or ripping and record the produced content into the storage device or a removable storage medium. It is to be noted that the term "self recording" signifies recording of an image picked up by an image pickup apparatus and/or sound collected by a sound collecting apparatus which the user apparatus 10 itself has as digital data of the image and/or sound. Meanwhile, the term "ripping" is to extract a digital content (sound data, image data or the like) recorded in a storage medium such as a music CD, a video DVD or a software CD-ROM, convert the digital content into data of a file format with which the data can be processed by a computer, and record the data obtained by the file format conversion into a storage device or a removable recording medium.

Where the user apparatus 10b, 10c and 10d are linked to the user apparatus 10a in such a manner as described above, a content downloaded into and capable of being reproduced by the user apparatus 10a can be reproduced also by any of the user apparatus linked to the user apparatus 10a. If any of the user apparatus 10 tries to reproduce a content, then a content key used to encrypt the content is required. Also the content key is in an encrypted form, and if the user apparatus 10a acquires a key used to encrypt the content key, then it can decrypt the content key, decrypt the content with the content key and then reproduce the content by the user apparatus 10 itself.

The copyright management server 20a is an information processing apparatus which transmits a content key in safety to a user so that a link process for allowing a content to be shared by apparatus owned by the user may be performed while restricting reproduction of the content. In particular, the copyright management server 20a performs a registration process of a user and user apparatus 10 owned by the user, performs linking of the user and the user apparatus or linking between the user apparatus, and encrypts and transmits a content key to the user apparatus 10.

The content providing server 20b is a server for providing contents and provides a content providing service to users. The content providing server 20b distributes, in response to a request from a user apparatus 10, a content to the user apparatus 10 through the network 30.

For example, when music contents are to be distributed, the content providing server 20b is formed as a server for providing an electronic music distribution (EMD) service. In this instance, the content providing server 20b compression codes a music content of a distribution object, for example, in accordance with the ATRAC3 (Advanced Transform Acoustic Coding) method or the MP3 (MPEG Audio Layer-3) method, encrypts the compression coded music content in accordance with an encryption method such as the DES (Data Encryption Standard) and distributes the encrypted music content to the user apparatus 10. Further, the content providing server 20b may encrypt and transmit a content key for decrypting the content to the user apparatus 10 together with the content encrypted in this manner. Furthermore, the content providing server 20b may provide the content key to the copyright management server 20a so that the copyright management server 20a may encrypt and transmit the content key to the user apparatus 10.

The content providing server 20b may be formed also as a server which provides a production content utilization service for managing utilization of a content produced by ripping, self recording or the like by a user apparatus 10 itself. In this instance, the content providing server 20b distributes a content key for decrypting the content to the user apparatus 10. Consequently, the user apparatus 10 can reproduce the content produced by ripping or the like by the user apparatus 10 itself using the content key acquired from the content providing server 20b.

The network 30 is a communication network for interconnecting the user apparatus 10, copyright management server 20a and content providing server 20b for communication therebetween. The network 30 may be formed from a public network such as the Internet, a telephone network or a satellite communication network, a dedicated network such as a WAN, a LAN or an IP-VPN and may be any of a wire network and a wireless network.

The content providing system 100 described above has a copyright management function of restricting the utilization of a content while it can enhance the portability of a content between the various user apparatus 10 to enhance the convenience to users and the degree of freedom in utilization of contents.

<3. Hardware Configuration of the User Apparatus>

Now, the hardware configuration of the user apparatus 10 according to the present embodiment is described. In the following, description is given of an example of the hardware configuration of the PC 10a and the PD 10d as representative ones of the user apparatus 10. It is to be noted that the PC 10a and the PD 10d as the user apparatus 10 are configured as different forms of the content processing apparatus of the present invention.

Figure 3:
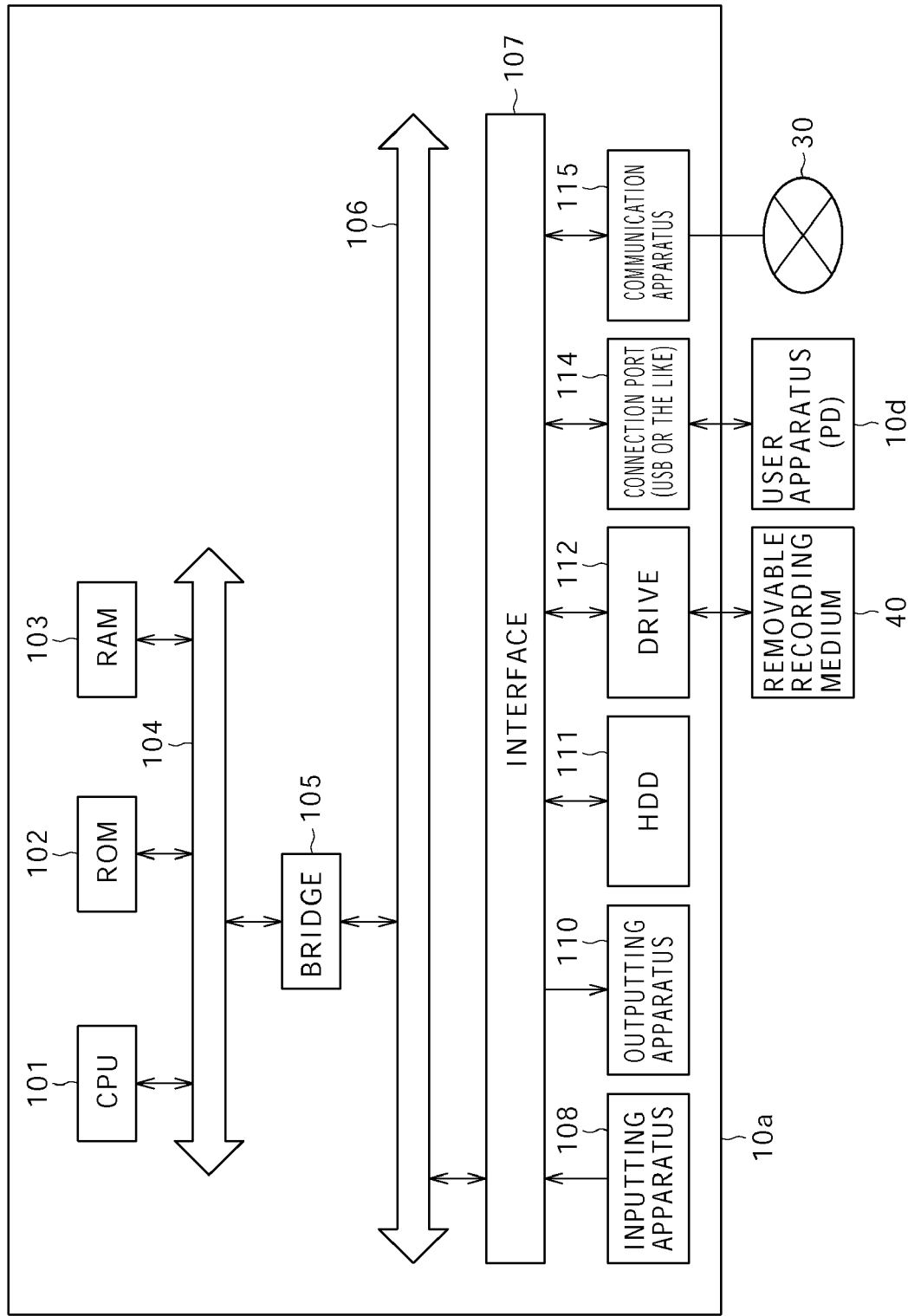
FIG. 3 is a block diagram schematically showing an example of a hardware configuration of a PC shown in FIG. 1.

First, the hardware configuration of the PC 10a according to the present embodiment is described with reference to FIG. 3. FIG. 3 schematically shows an example of a hardware configuration of the PC 10a according to the present embodiment.

As shown in FIG. 3, the PC 10a includes, for example, a CPU (Central Processing Unit) 101, a ROM (Read Only Memory) 102, a RAM (Random Access Memory) 103, a host bus 104, a bridge 105, and an external bus 106. The PC 10a further includes an interface 107, an inputting apparatus 108, an outputting apparatus 110, a storage apparatus (hard disk drive: HDD) 111, a drive 112, a connection port 114, and a communication apparatus 115.

The CPU 101 functions as an arithmetic operation processing apparatus and a control apparatus and operates in accordance with the programs stored in the ROM 102 or the HDD 111 to control the components of the PC 10a. The particular processes executed by the CPU 101 include, for example, encryption and decryption processes of a content, production and verification processes of a digital signature (MAC (Message Authentication Code) or the like) for data falsification prevention and data verification, authentication and session key sharing processes executed upon inputting or outputting of a content or the like from or to another user apparatus 10 connected to the PC 10a, input and output process control of a content, a license, a content key or the like, a copyright management process such as license evaluation and other necessary processes.

The ROM 102 stores programs, arithmetic operation parameters and so forth to be used by the CPU 101. The ROM 102 may be utilized also as a storage element for storing a content, a license, a content key and so forth. The RAM 103 temporarily stores a program to be used for execution by the CPU 101, parameters which vary suitably during the execution and so forth. The CPU 101, ROM 102 and RAM 103 are connected to each other by the host bus 104 formed from a CPU bus or the like.

The host bus 104 is connected through the bridge 105 to the external bus 106 such as a PCI (Peripheral Component Interconnect/Interface) bus or the like.

The inputting apparatus 108 is formed from inputting elements such as, for example, a mouse, a keyboard, a touch panel, buttons, switches and levers, an input control circuit for producing and outputting an input signal to the CPU 101, and so forth. The user of the PC 10a can operate the inputting apparatus 108 to input various data to the PC 10a and issue an instruction of a processing operation to the PC 10a.

The outputting apparatus 110 is formed from a display apparatus such as, for example, a CRT (Cathode Ray Tube) display apparatus, a liquid crystal display (LCD) apparatus, lamps or the like and a sound outputting apparatus such as a speaker. The outputting apparatus 110 outputs, for example, a reproduced content. In particular, the display apparatus displays a reproduced image content as moving pictures or still pictures in the form of a text or an image. Meanwhile, the sound outputting apparatus emits sound of a reproduced sound content.

The HDD 111 is an apparatus for data storage formed as an example of a storage section of the PC 10a according to the present embodiment. The HDD 111 stores programs to be executed by the CPU 101 and various data on a hard disk. Further, various data, for example, of contents, licenses and content keys are stored in the HDD 111.

The drive 112 is a reader/writer for a storage medium and is built in or externally provided for the PC 10a. The drive 112 records/reproduces various data of contents, licenses and content keys on/from a removable recording medium 40 such as a magnetic disk (HD or the like), an optical disk (CD, DVD or the like), a magneto-optical disk (MO or the like) or a semiconductor memory loaded in the PC 10a.

In particular, the drive 112 reads out data recorded on the removable recording medium 40 and supplies the data to the RAM 103 through the interface 107, external bus 106, bridge 105 and host bus 104. The CPU 101 stores the data into the RAM 103, the HDD 111 or the like as occasion demands. On the other hand, the drive 112 receives data stored in the RAM 103, the HDD 111 or the like, data newly produced or data acquired from an external apparatus from the CPU 101 and writes the data on the removable recording medium 40.

The connection port 114 is a port for connecting the PC 10a to an external peripheral apparatus such as, for example, another user apparatus 10 and has connection terminals such as USB terminals, IEEE1394 terminals or the like. The connection port 114 is connected to the CPU 101 and so forth through the interface 107, external bus 106, bridge 105, host bus 104 and so forth. By such a connection port 114 as just described, the PC 10a is connected to the user apparatus 10d and so forth through a local line and can communicate various data to and from the PD 10d and so forth.

The communication apparatus 115 is a communication interface formed from a communication device or the like for connecting, for example, to the network 30. The communication apparatus 115 transmits and receives various data of a content, a content key and so forth to and from an external apparatus such as another user apparatus 10, the copyright management server 20a or the content providing server 20b through the network 30.

Figure 4:
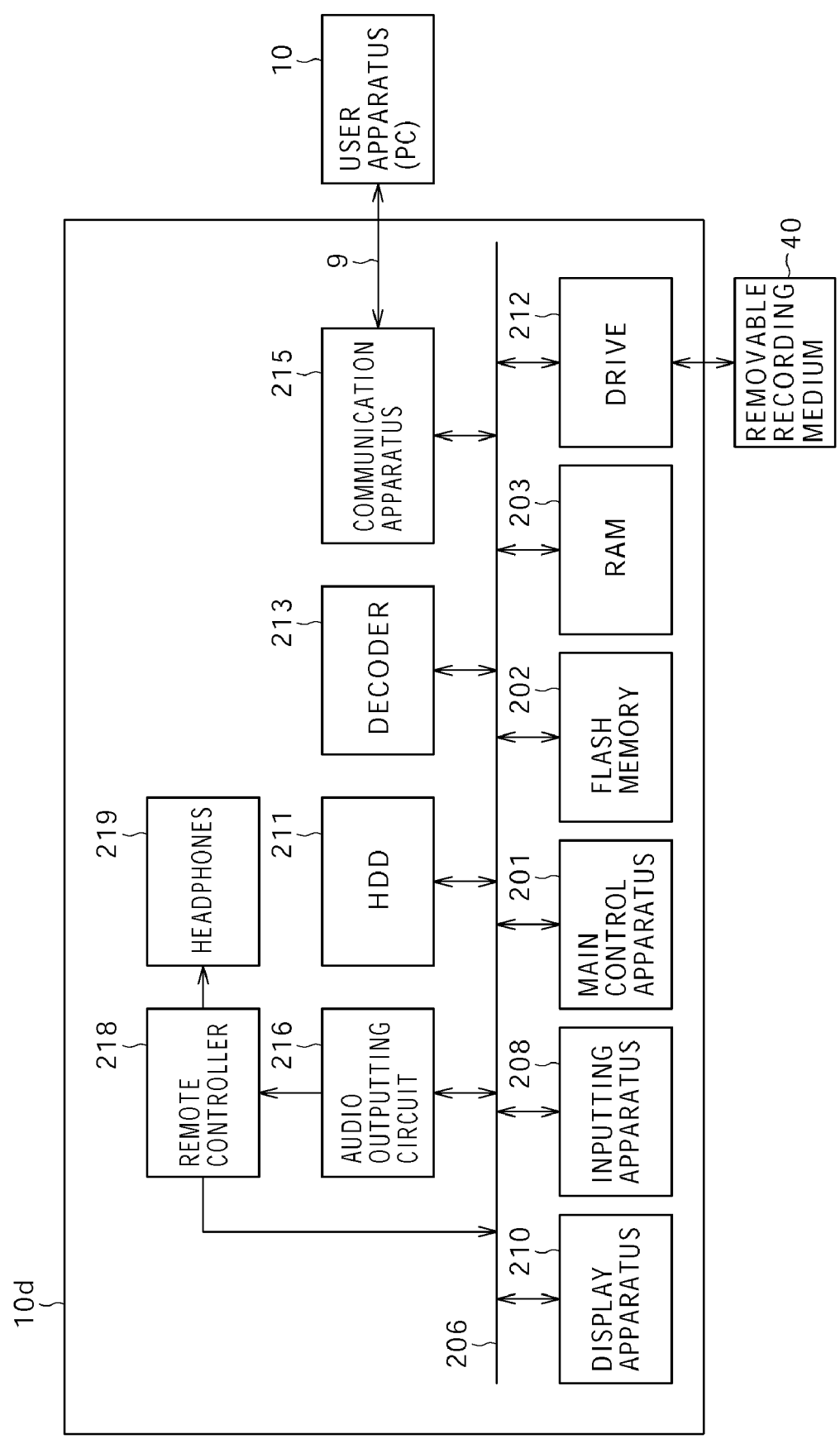
FIG. 4 is a block diagram schematically showing an example of a hardware configuration of a PD shown in FIG. 1.

Now, a hardware configuration of the PD 10d according to the present embodiment is described in detail with reference to FIG. 4. FIG. 4 is a block diagram schematically shows an example of a hardware configuration of the PD 10d according to the present embodiment.

As shown in FIG. 4, the PD 10d includes, for example, a control apparatus 201, a flash memory 202, a RAM 203, a bus 206, an inputting apparatus 208, a display apparatus 210, a HDD 211, a drive 212, a decoder 213, a communication apparatus 215, an audio outputting circuit 216, a remote controller 218, and a headphones 219.

The control apparatus 201 operates in accordance with various programs, for example, stored in the flash memory 202 or the HDD 211 and controls the components of the PD 10d. The flash memory 202 stores, for example, a program which defines action of the control apparatus 201 and various data. The flash memory 202 can be utilized also as a storage section for storing a content, a license, a content key and so forth. Meanwhile, the RAM 203 is formed from, for example, an SDRAM (Synchronous DRAM) and temporarily stores various data relating to processes of the control apparatus 201.

The bus 206 is a data line which interconnects the control apparatus 201, flash memory 202, RAM 203, inputting apparatus 208, display apparatus 210, HDD 211, drive 212, decoder 213, communication apparatus 215, audio outputting circuit 216 and so forth.

The inputting apparatus 208 and the remote controller 218 are formed from operation elements such as, for example, a touch panel, button keys, levers, dials and so forth, and an input control circuit which produces an input signal in response to an operation of any of the operation elements by the user and outputs the input signal to the control apparatus 201. The user of the user apparatus 10 can input various data or input a processing action instruction to the user apparatus 10 by operating the inputting apparatus 208 or the remote controller 218 which is hereinafter described.

The display apparatus 210 is formed from, for example, an LCD panel, an LCD control circuit and so forth. The display apparatus 210 displays various kinds of information in the form of a text or an image under the control of the control apparatus 201.

The HDD 211 is an apparatus for data storage formed as an example of a storage section of the PD 10d according to the present embodiment. The HDD 211 is formed from, for example, a hard disk drive (HDD) having a storage capacity of several tens GB and stores contents, licenses, content keys, programs of the control apparatus 201 and various data. The PD 10d including the HDD 211 described above is formed as a content recording and reproduction apparatus which can record and reproduce a content. Consequently, the PD 10d can store not only a content provided from the PC 10a through the removable recording medium 40 but also a content received from the PC 10a or the like through a local line into the HDD 211 and reproduce the content. However, the present invention is not limited to the specific example just described above, but the PD 10d may be configured, for example, as an apparatus for exclusive use for reproduction of a content without including the HDD 211. In this instance, the PC 10a can read out, for example, a content stored in the removable recording medium 40 and execute only reproduction of the content (cannot perform recording).

The drive 212 is a reader/writer for a storage medium and is built in the PD 10d. The drive 212 records/reproduces various data of a content, a license, a content key and so forth on/from the removable recording medium 40 loaded in the user apparatus 10b. The decoder 213 performs a decryption process, a decoding process, a surround process, a conversion process into PCM data and so forth of an encrypted content.

The communication apparatus 215 is formed from a USB controller, a USB terminal and so forth and transmits and receives various data of a content, a license, a control signal and so forth to and from a user apparatus 10 such as the PC 10a connected through the local line such as a USB cable.

The audio outputting circuit 216 amplifies analog audio data decoded by the decoder 213 and DA converted by the control apparatus 201 and outputs the amplified analog audio data to the remote controller 218. The analog audio data are outputted from the remote controller 218 to the headphones 219 and outputted as sound from a speaker (not shown) built in the headphones 219.

An example of a hardware configuration of the PC 10a and the PD 10d which are examples of the user apparatus 10 is described above with reference to FIGS. 3 and 4. However, the user apparatus 10 which utilize a content are not limited to the examples of the PC 10a and the PD 10d described above but may include such various apparatus as a sound player of the installed type or as other electronic apparatus or information processing apparatus such as a television apparatus or a portable telephone set. Accordingly, each of the user apparatus 10 executes processes according to a hardware configuration unique to the apparatus.

<4. Functional Configuration of the Copyright Management Server>

Figure 5:
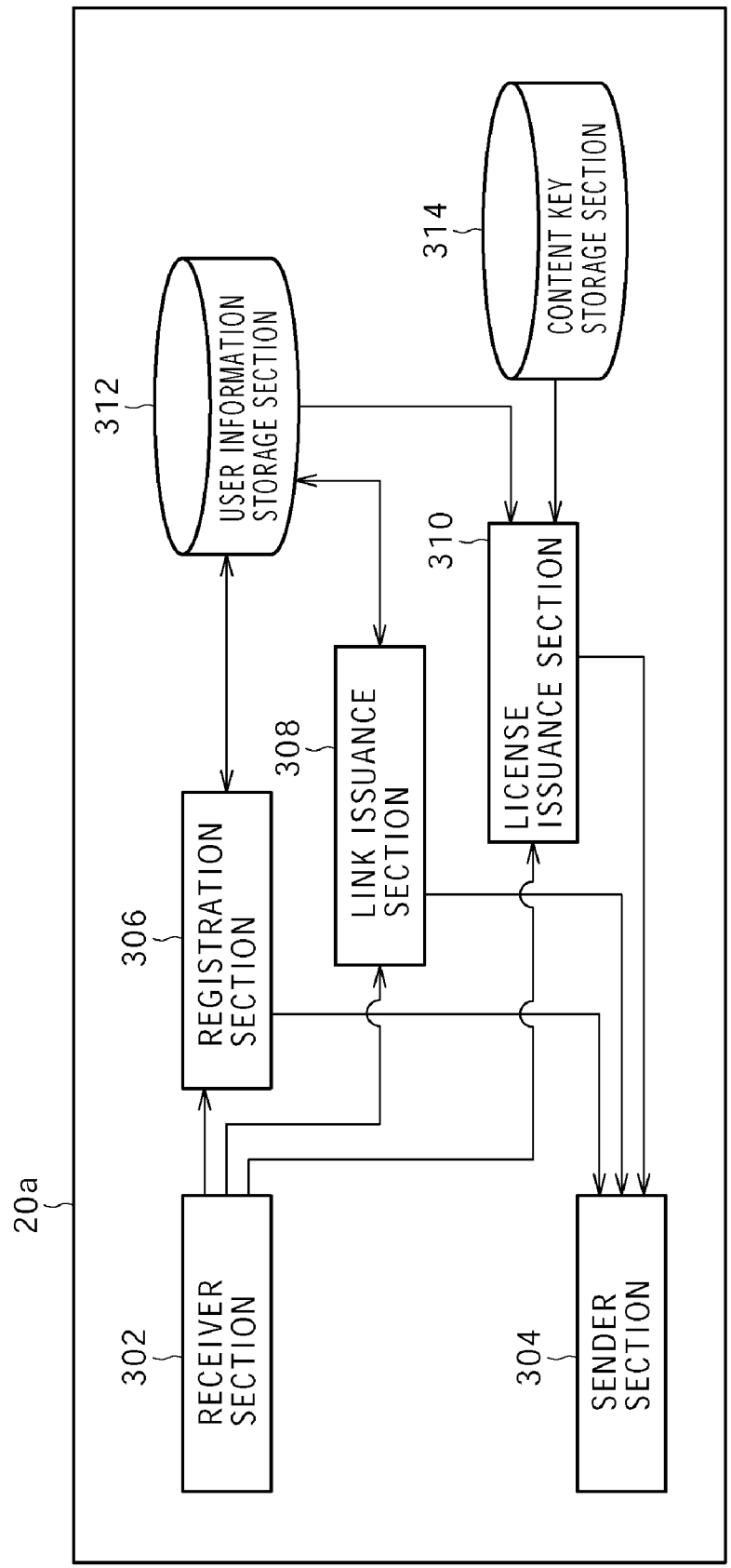
FIG. 5 is a block diagram showing a functional configuration of a copyright management server shown in FIG. 2.

Now, a functional configuration of the copyright management server 20a is described with reference to FIG. 5. The copyright management server 20a includes a receiver section 302, a sender section 304, a registration section 306, a link issuance section 308, a license issuance section 310, a user information storage section 312, a content key storage section 314 and so forth.

The receiver section 302 is a communication interface formed from, for example, a communication line, a communication circuit, a communication device and so forth. The receiver section 302 receives attribute information of the user apparatus 10 connected to the copyright management server 20a through the network 30 and further receives information inputted to the user apparatus 10.

The registration section 306 performs a registration process of a new user who wants to utilize the content providing service and/or the copyright management service, a registration alteration process, a registration cancellation process, management of user account information (user ID, credit number, password and so forth) and so forth. To each user who is registered for any of the services, a key unique to the user is provided. The key provided here may be a public key and a private key paired with each other and used for public key cryptography or a common key used for private key cryptography. The key information is stored into the user information storage section 312 together with the user ID.

The registration section 306 further performs management of user apparatus owned by the user. The registration section 306 acquires particular information of a user apparatus (type, model, version and so forth of the apparatus) through the receiver section 302 and provides a device ID and a key unique to the user apparatus. Here, the device ID is identification information with which the user apparatus can be specified uniquely. The device ID may be a device ID set to the user apparatus in advance so that the user apparatus may be managed with the device ID.

In this manner, the key information provided by the registration section 306 is stored in an associated relationship with the user ID or the device ID into the user information storage section 312, and node information is produced from the user ID or the device ID and the key information. Then, the node information is transmitted to the user or the user apparatus through the sender section 304. The user or the user apparatus receives the node information and acquires an ID identified uniquely in the copyright management server 20a.

The key provided by the registration section 306 is used to encrypt a content key by the server or to decrypt a content key encrypted by a user apparatus. For example, if the server encrypts a content key with a public key of the user, then the user receiving the content key must decrypt the content key with a private key of the user. Accordingly, in this instance, it is necessary to transmit the private key of the user to the user in advance.

The link issuance section 308 has a function of associating a user and a user apparatus owned by the user with each other or associating user apparatus owned by the user with each other. In particular, the link issuance section 308 produces link information for linking a user apparatus to the user in response to an input from the user apparatus and transmits the link information to the user apparatus. The link issuance section 308 stores the link information also into the user information storage section 312. For example, it is assumed that a user who registers itself into the copyright management service wants to freely reproduce a content purchased by the user on three user apparatus owned by the user. The user would transmit a link request of the three user apparatus owned by the user itself to the copyright management server 20a. The link issuance section 308 of the copyright management server 20a receiving the link request links the user and the three user apparatus owned by the user to each other.

Here, to link the user and the three user apparatus to each other is to encrypt the private key of the user stored in the user information storage section 312 with public keys of the individual user apparatus. Where the content key for decrypting a content purchased by the user is encrypted with a private key, the encrypted content key cannot be decrypted without the private key of the user. However, if the user apparatus owned by the user are linked to the user, then any of the user apparatus owned by the user can acquire the private key of the user and decrypt the content key using the acquired private key. Further, the user apparatus can decrypt the encrypted content with the decrypted content key and reproduce the content.

The user information storage section 312 stores the key information and the link information in an associated relationship with the user ID and the device IDs. By acquiring the user ID or any of the device IDs, the copyright management server 20a can acquire key information corresponding to each user or user apparatus stored in the user information storage section 312.

User information stored in the user information storage section 312 is described with reference to FIG. 6. As seen in FIG. 6, information of a user ID 3121, a credit card number 3122, a user key 3123, a device ID 3124, a device key 3125, a link 3126 and so forth is stored in the user information storage section 312.

The user ID 3121 and the credit card number 3122 are user account information of the user who receives the content providing service and the copyright management service provided to the user and is identification information with which the user can be specified uniquely. The user key 3123 is key information allocated to a user ID in the user ID 3121.

The device ID 3124 retains an ID of user apparatus linked to and owned by a user. The device key 3125 retains numbers identified uniquely in the content providing system 100. Each of the numbers may be an identification number set to each user apparatus upon shipment from a factory or the like or an identification number set by the registration section 306 of the copyright management server 20a.

The device key 3125 retains key information allocated to the user apparatus. Also the device key 3125 may retain a device key set to each user apparatus in advance or key information allocated by the registration section 306.

The link 3126 retains link information set for each user apparatus. For example, if the user apparatus 1 is link to "Yamada Taro", then the "link A" includes information of the direction of the association of the device ID and the user ID and information obtained by encrypting the user key A (private key) with the device key 1 (public key). The information of each of the links in the link 3126 may be transmitted to the corresponding user apparatus so that it may be stored into the storage section of the user apparatus or may be acquired by the corresponding user apparatus through accessing of the user apparatus to the server. The stored information of the user information storage section 312 is such as described hereinabove.

Referring back to FIG. 5, the link issuance section 308 issues a license including a content key to a user who purchases a content. Thereupon, the license issuance section 310 encrypts the content key included in the license with the private key of the user so that the content key can be distributed in safety to the user. The license may further include utilization conditions and so forth of the content. The content key and the utilization conditions of the content may be provided otherwise from the content providing server 20b.

The license issued by the license issuance section 310 is transmitted to the user apparatus 10 through the sender section 304. Further, the license may be stored into the user information storage section 312.

The license includes a content ID for identification of the content and so forth. The user may acquire the license from the copyright management server 20a after it purchases the content or may alternatively acquire the license in advance before it purchases the content and then purchase the content.

Further, the user information storage section 312 in which content keys are stored and the license issuance section 310 may be provided alternatively in the content providing server 20b. In this instance, the content providing server 20b may acquire information of a user key for encryption of a content key and so forth from the copyright management server 20a and encrypt the content key to produce a license. The license produced by the content providing server 20b may be transmitted to the user apparatus owned by the user together with the content.

The sender section 304 is a communication interface formed from, for example, a communication line, a communication circuit, a communication device and so forth. The sender section 304 has a function of transmitting node information issued when a registration process is performed by the registration section 306, link information issued by the link issuance section 308 and a license issued by the license issuance section 310 to the user apparatus 10 through the network.

Content keys are stored in the content key storage section 314. The content key storage section 314 may receive and store a content key produced by the content providing server 20b or may store a content key produced by the copyright management server 20a. For example, the copyright management server 20a may produce and transmit a content key to a user apparatus and further transmit the content key to the content providing server 20b. The content providing server 20b receiving the content key may encrypt a content purchased by the user with the content key and transmit the encrypted content to the user apparatus 10.

The functional configuration of the copyright management server 20a is described above. Now, a content providing method by the link system which utilizes the content providing system 100 is described. FIGS. 7 to 11 illustrate basic flows of processes of the content providing method by the link system. A user apparatus (PC) 10 and the copyright management server 20a included in the content providing system 100 are connected to each other for communication in safety therebetween through the network 30.

<5. User Apparatus and User Registration Method>

FIG. 7 illustrates a registration method of the user apparatus (PC) 10a connected to the network from among the user apparatus. First, specification information of the user apparatus (PC) 10a is transmitted to the copyright management server 20a (step S102). The specification information of the user apparatus here is information which can specify the user apparatus such as an apparatus type, a model, a version and so forth of the user apparatus. The specification information of the user apparatus may be transmitted from the user apparatus (PC) 10a in response to a user input, or where specification information is set to the user apparatus (PC) 10a in advance, it may be transmitted to the copyright management server 20a after a communication connection between the user apparatus (PC) 10a and the copyright management server 20a is established.

The copyright management server 20a receiving the specification information of the user apparatus (PC) 10a at step S102 stores the specification information into the user information storage section 312 of the copyright management server 20a (step S104). Further, based on the received specification information of the user apparatus (PC) 10a, the copyright management server 20a applies a device ID with which the user apparatus (PC) 10a can be specified uniquely to the user apparatus (PC) 10a. Furthermore, the copyright management server 20a issues a device key for the user apparatus (PC) 10a. The device ID and the device key issued in this manner are stored in an associated relationship with the specification information of the user apparatus (PC) 10a into the user information storage section 312. The device key is issued for each apparatus and may include a public key and a private key paired with each other to be used in public key cryptography or may be a common key used in private key cryptography.

After registration of the user apparatus (PC) 10a is performed at step S104, the copyright management server 20a issues a node including the device ID and the device key issued at step S104 (step S106). The node issued at step S106 is information with which the copyright management server 20a can uniquely specify the user apparatus (PC) 10a and at least includes the device ID. However, the node may include the device key or the specification information of the user apparatus (PC) 10a or the like. The node issued at step S106 is transmitted to the user apparatus (PC) 10a (step S108).

The user apparatus (PC) 10a stores the node information transmitted to the copyright management server 20a into the memory provided therein.

The method of registering the user apparatus (PC) 10a connected to the network is such as described above. Now, a method of registering a user apparatus which is not connected to the network such as, for example, the PD 10d is described with reference to FIG. 8.

FIG. 8 illustrates a registration method of the user apparatus (PD) 10d which is not connected to the network. First, specification information of the user apparatus (PD) 10d is provided to the user apparatus (PC) 10a (step S110). For example, an apparatus type, a model, a version and so forth of the user apparatus (PD) 10d may be transmitted to the user apparatus (PC) 10a after the user apparatus (PD) 10d is connected to the user apparatus (PC) 10a, or the specification information of the user apparatus (PD) 10d may be transmitted to the user apparatus (PC) 10a in response to an input of the user.

The user apparatus (PC) 10a acquiring the specification information of the user apparatus (PD) 10d at step S110 transmits the specification information of the user apparatus (PD) 10d to the copyright management server 20a (step S112). The copyright management server 20a receiving the specification information of the user apparatus (PD) 10d at step S112 registers the user apparatus (PD) 10d (step S114). In particular, at step S114, the copyright management server 20a stores the specification information of the user apparatus (PD) 10d into the user information storage section 312, issues a device ID and a device key for the user apparatus (PD) 10d and stores the device ID and the device key in an associated relationship with the specification information of the user apparatus (PD) 10d into the user information storage section 312.

After the registration process of the user apparatus (PD) 10d is performed at step S114, the copyright management server 20a issues a node of the user apparatus (PD) 10d (step S116). The node issued at step S116 includes the identification information of the user apparatus (PD) 10d with which the copyright management server 20a can uniquely specify the user apparatus (PD) 10d and the device key and so forth. The node of the user apparatus (PD) 10d issued at step S116 is transmitted to the user apparatus (PC) 10a (step S118).

The user apparatus (PC) 10a to which the node information of the user apparatus (PD) 10d is transmitted from the copyright management server 20a at step S118 provides the node information of the user apparatus (PD) 10d to the user apparatus (PD) 10d (step S120). The user apparatus (PD) 10d to which the node information is provided at step S120 stores the node information into the storage section such as a memory. The node information of the user apparatus (PD) 10d may otherwise be stored into the memory of the user apparatus (PC) 10a.

In order for the user apparatus (PD) 10d to acquire a content and a content key for decrypting the content, it must be connected to the user apparatus (PC) 10a. Accordingly, if the user apparatus (PC) 10a has the information of the user apparatus (PD) 10d stored therein, then the user apparatus (PC) 10a can decide whether or not the content received can be reproduced by the user apparatus (PD) 10d.

The registration method of the user apparatus (PD) 10d which is not connected to the network is such as described above. Now, a registration method of a user who uses a user apparatus is described with reference to FIG. 9.

FIG. 9 illustrates a registration method of a user. The registration method of the user A is performed through the user apparatus (PC) 10a connected to the network. First, specification information of the user A is transmitted to the copyright management server 20a (step S122). Here, the specification information of the user A includes a user ID of the user A and a credit card number or the like owned by the user A. The user ID is identification information with which the user can be specified uniquely by the copyright management server 20a and may be identification information designated by the user A or provided by the copyright management server 20a.

The copyright management server 20a to which the specification information of the user A is transmitted at step S122 performs a registration process of the user A (step S124). In particular, at step S124, the copyright management server 20a stores the user ID, credit number and so forth of the user A into the user information storage section 312. Further, the copyright management server 20a issues a user key for the user A and stores the user key in an associated relationship with the user ID and so forth into the user information storage section 312.

Then, the copyright management server 20a issues a node including the user ID and the user key stored in the user information storage section 312 (step S126). The copyright management server 20a transmits the node information issued at step S126 to the user apparatus (PC) 10a.

A user who owns a user apparatus registers the user apparatus owned thereby into the copyright management server 20a through a network in such a manner as described above. Further, user registration of a user who utilizes the content providing service or the copyright management service is performed. Consequently, the copyright management server 20a which provides the copyright management service can store and manage information of users who desire to utilize the copyright management service and information of user apparatus owned by the users into and in the user information storage section 312. Further, the copyright management server 20a can store and manage also key information issued to the users and the user apparatus in an associated relationship with the users or the user apparatus into and in the user information storage section 312.

The copyright management server 20a can acquire the user ID of the user A through a user apparatus connected to the network to know the user apparatus owned by the user and key information of the user. For example, in order to distribute a content key used to encrypt a content in safety to a user, the copyright management server 20a may encrypt the content key further with the user key of the user A. The copyright management server 20a acquires, based on the acquired user ID of the user A, the cryptographic key of the user A stored in the user information storage section 312 and encrypts the content key with the user key of the user A. Since the content key encrypted with the public key of the user A cannot be decrypted without using the private key of the user A, the copyright management server 20a can transmit the content in safety to the user. Further, since only the user A who purchases the content can decrypt the content key, also it is possible to restrict the user who can decrypt the content key.

However, even if the content key can be decrypted with the cryptographic key of the user A, if the content cannot be reproduced on the user apparatus owned by the user A, then the user A cannot enjoy the content. In the present content providing system, since each user apparatus is associated with a user, a content purchased by the user A can be reproduced on the user apparatus. Now, association between the user A and the user apparatus is described.

<6. Association Between the User A and the User Apparatus>

Figure 11:
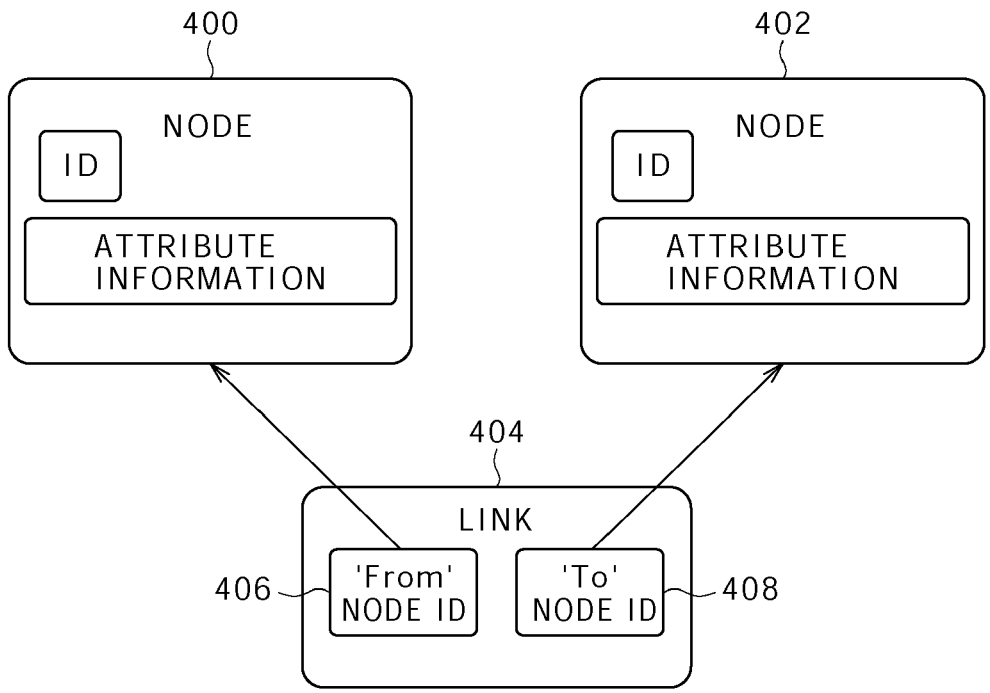
FIG. 11 is a diagrammatic view illustrating the substance of link information used in the content providing system of FIG. 1.

FIGS. 10 and 11 illustrate association between the user A and the user apparatus. First, association between the user apparatus (PC) 10a connected to the network and the user A is described. In order to associate the user apparatus (PC) 10a and the user A with each other, the node of the user apparatus (PC) 10a and the node of the user A issued by the registration process described hereinabove are transmitted to the copyright management server 20a (step S130).

The copyright management server 20a acquiring the node information of the user apparatus (PC) 10a and the node information of the user A at step S130 produces a link for associating the user apparatus (PC) 10a and the user A with each other (step S132). The link produced at step S132 includes, for example, the node information of the user apparatus (PC) 10a, the node information of the user A and the direction of the association. The node information included in the link information may be any information with which the user apparatus or the user can be identified uniquely and may be the device ID of the user apparatus or the user ID of the user. For example, the direction of the association is information representing which node is associated with which node. The direction of the association is information representative of the direction from the user apparatus (PC) 10a which serves as a source of the link to the user A which serves as a destination of the link.

Here, the link produced at step S132 is described in detail with reference to FIG. 11. As described hereinabove, the user apparatus (PC) 10a and the user A are managed as a node from the device ID or the user ID by the copyright management server 20a. If such node information 400 or 402 is transmitted to the copyright management server 20a, then the copyright management server 20a sets information of "From" 406 and "To" 408 included in a link 404. When the user apparatus (PC) 10a is to be associated with the user A, the node ID of the user apparatus (PC) 10a which serves as a source of the link is set to the "From" 406, and the node ID of the user A is set to the "To" 408. The node ID here is identification information for identification of a node of the user apparatus (PC) 10a or the user A and may be the device ID of the user apparatus (PC) 10a or the user ID of the user A.

The link 404 may further include key information obtained by encrypting private information of the user A which serves as a destination of the link with the public key of the user apparatus (PC) 10a which serves as a source of the link. The private information of the user A is information which can originally be known only to the user A and may be information of the private key of the user A or the like.

Referring back to FIG. 10, the link information produced at step S132 is stored in an associated relationship with the device ID of the user apparatus (PC) 10a of the destination of the link into the user information storage section 312 (step S134). Consequently, the copyright management server 20a can manage with which user each of the user apparatus stored in the user information storage section 312 is associated. Then, the copyright management server 20a issues link information including the device ID of the user apparatus, the user ID of the user and the direction of the association (step S136) and transmits the link information to the user apparatus (PC) 10a (step S138). As described hereinabove, the link information transmitted to the user apparatus (PC) 10a may include key information obtained by encrypting the private information of the user A with the public key of the user apparatus (PC) 10a.

The user apparatus (PC) 10a receiving the link information at step S138 can know, from the received link information, with which user the user apparatus (PC) 10a is associated. Further, where the user apparatus (PC) 10a is associated with the user A, the user apparatus (PC) 10a can know the private information of the user A using the key information included in the link. For example, if the user A registers the user A itself into the content providing service and purchases a content, then the content is encrypted and transmitted to the user A. The content key used to encrypt the content is encrypted with the private key of the user A and transmitted to the user apparatus (PC) 10a owned by the user A. At this time, if the user apparatus (PC) 10a is associated with the user A, then the user apparatus (PC) 10a can acquire the private information of the user A included in the link information received from the copyright management server 20a and decrypt the encrypted content key using the private information.

Figure 12:
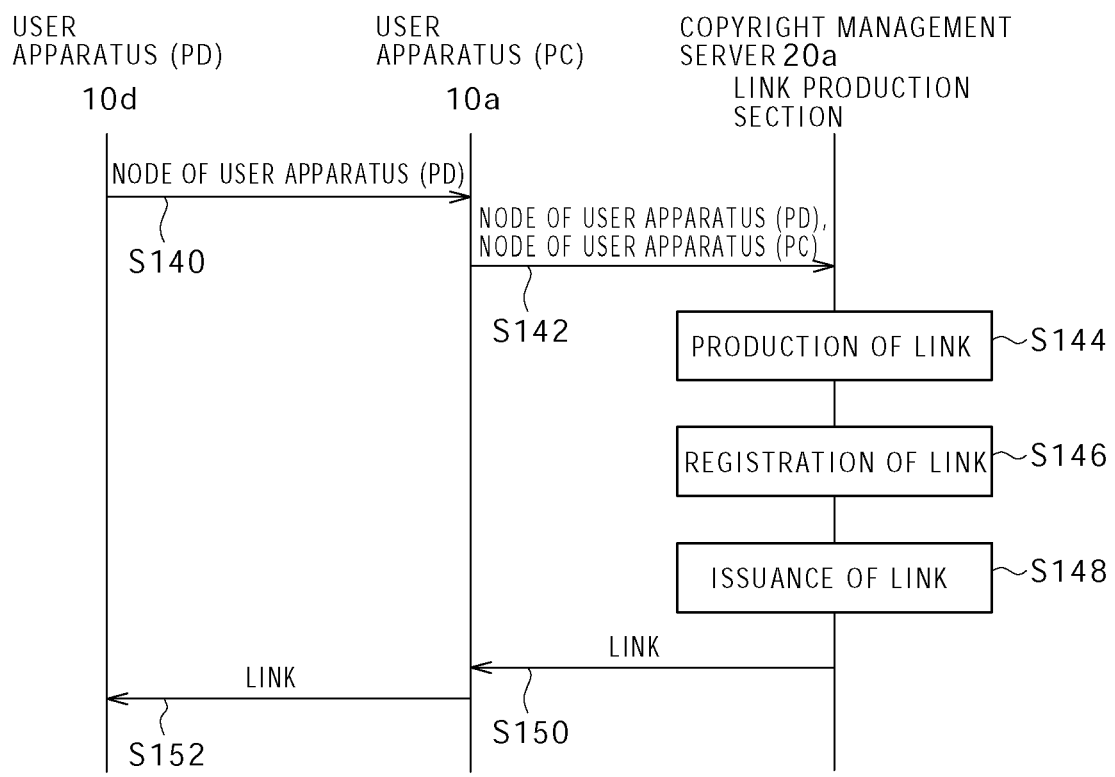
FIG. 12 is a timing chart illustrating another link process of the content providing system of FIG. 1.

Association between the user apparatus (PC) 10a connected to the network and the user A is such as described above. Now, association between the user apparatus (PD) 10d which is not connected to the network and the user apparatus (PC) 10a is described with reference to FIG. 12.

First, the user apparatus (PC) 10a acquires node information of the user apparatus (PD) 10d connected to the user apparatus (PC) 10a (step S140). The user apparatus (PC) 10a acquiring the node information of the user apparatus (PD)

10d at step S140 transmits the node information of the user apparatus (PD) 10d and the node information of the user apparatus (PC) 10a itself to the copyright management server 20a (step S142). At step S142, the user apparatus (PC) 10a may transmit the direction of association together with the node information of the user apparatus (PD) 10d and the user apparatus (PC) 10a.

The copyright management server 20a receiving the nodes of the user apparatus and the information of the direction of association at step S142 produces a link based on the received information (step S144). As described above, the link information produced at step S144 includes the node information of the user apparatus (PD) 10d, the node information of the user apparatus (PC) 10a, and the information of the direction of association.

The link information produced at step S144 is recorded in an associated relationship with the device ID of the user apparatus (PD) 10d into the user information storage section 312 (step S146). Then, the copyright management server 20a issues node information which includes the node information of the user apparatus (PD) 10d, the node information of the user apparatus (PC) 10a and the information of the direction of association (step S148). Then, the copyright management server 20a transmits the link information to the user apparatus (PC) 10a (step S150).

The user apparatus (PC) 10a receiving the link information from the copyright management server 20a at step S150 provides the link information to the user apparatus (PD) 10d (step S152). As described above, the link information includes information representing that the user apparatus (PD) 10d is associated with the user apparatus (PC) 10a. In other words, the node information of the user apparatus (PD) 10d is set to the "From" 406 of the link 404 and the node information of the user apparatus (PC) 10a is set to the "To" 408 of the link 404.

The link further includes key information obtained by encrypting the private key of the user apparatus (PC) 10a stored in the user information storage section 312 with the public key of the user apparatus (PD) 10d or the like. By acquiring the link information, the user apparatus (PD) 10d can acquire the information of the private key of the user apparatus (PC) 10a.

Further, when a link is issued at step S148, the link information of the user apparatus (PC) 10a which is a link destination of the user apparatus (PD) 10d may be transmitted. Where the user apparatus (PC) 10a is associated with the user A, also the link information which associates the user apparatus (PC) 10a and the user A with each other is transmitted to the user apparatus (PD) 10d. Consequently, after the user apparatus (PD) 10d acquires the information of the private key of the user apparatus (PC) 10a, it can acquire also the information of the private key of the user A using the information of the private key of the user apparatus (PC) 10a.

Figure 13:
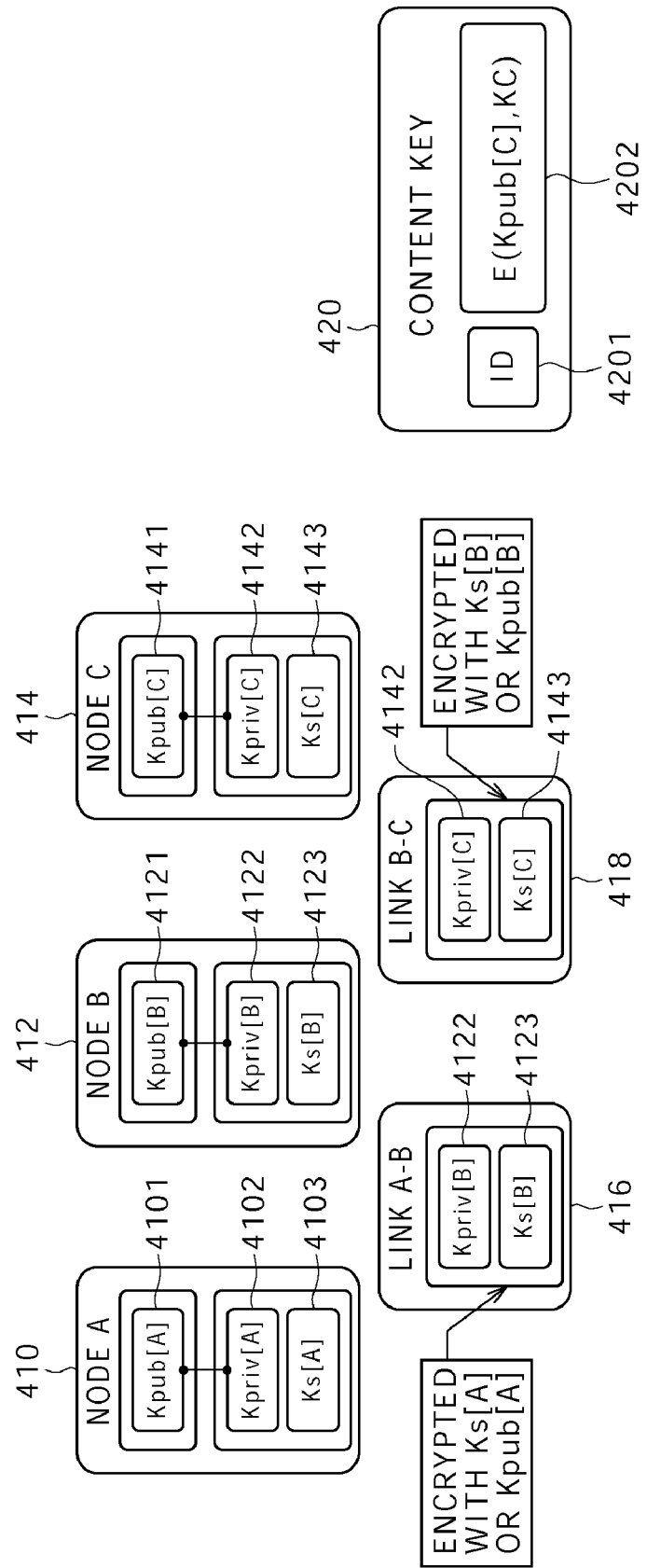
FIG. 13 is a view illustrating key information included in a link used in the content providing system of FIG. 1.

Now, key information included in a link is described with reference to FIG. 13. FIG. 13 illustrates key information included in a link.

As seen in FIG. 13, it is assumed that three nodes of a node A, another node B and a further node C are stored in the user information storage section 312 of the copyright management server 20a. As described hereinabove, node information including identification information, key information and so forth is allocated to each user apparatus or each user. A private key, a public key, a common key and so forth are issued to each of the users and the user apparatus.

The information included in the nodes is described. The node A 410 includes a public key (Kpub[A]) 4101, a private key (Kpriv[A]) 4102 and a common key (Ks[A]) 4103. Where the public key cryptography method is used to perform encryption, encryption is performed using the public key 4101 and decryption is performed using the private key 4102 paired with the public key 4101. On the other hand, where the common key cryptography method is used, the same key is used for both of encryption and decryption, and the common key 4103 is used to perform encryption whereas the common key 4103 is used to perform decryption.

The public key cryptography method is a method wherein the key for encryption is laid open while the key for decryption is kept secret. For example, the public key 4101 of the node A is stored in a public key file on the network and can be referred to freely by anybody. On the other hand, the private key 4102 paired with the public key 4101 is managed secretly such that it cannot be acquired by any other than the copyright management server 20a and the user A.

On the other hand, the common key cryptography method described hereinabove is a method wherein the transmission side and the reception side share and keep a common key secret. For example, the common key 4103 of the node A must be managed secret so that it may not be acquired by any other than the copyright management server 20a and the node A.

Similarly, the node B 412 includes a public key (Kpub[B]) 4121, a private key (Kpriv[B]) 4122 and a common key (Ks[B]) 4123 of the node B. The node C 414 includes a public key (Kpub[C]) 4141, a private key 4142 (Kpriv[C]) 4141 and a common key (Ks[C]) 4143 of the node C.

As seen in FIG. 13, in order to associate the node A with the node B, a link 416 is issued. The link 416 includes the node ID of the node A, the node ID of the node B and the information of the direction of association between the node A and the node B. As described hereinabove, where the node A is associated with the node B, the link source is the node A and the link destination is the node B. Further, the link 416 includes key information obtained by encrypting the private key 4122 which is the private information of the node B and the common key 4123 with the public key 4101 or the common key 4103 of the node A.

The node A acquiring the link 416 can know with which node the node A itself is associated and acquire the private information of the link destination associated therewith. Since the private information of the node B included in the link 416 is encrypted with the public key 4101 or the common key 4103, it cannot be decrypted without using the private key 4102 or the common key 4103 of the node A which is managed secretly by the node A itself. In other words, the key information included in the link 416 cannot be decrypted even if anyone other than the node A acquires the same.

Similarly, the link 418 includes the node ID of the node B, the node ID of the node C and the information of the direction of association between the node B and the node C. The information of the direction included in the link 418 is the direction from the node B to the node C, and the link source is the node B while the link destination is the node C. Further, the link 418 includes information obtained by encrypting the private information of the node C with the public key 4121 or the common key 4123 of the node B. The node B can acquire the private key 4142 or the common key 4143 of the node C from the link 418.

For example, it is assumed that the node C is information allocated to the user who purchases a content. The user purchasing the content would transmit the node C to the copyright management server 20a. The copyright management server 20a receiving the node C which is a node of the user encrypts a content key (KC) used to encrypt the content purchased by the user with the public key (Kpub[C]) of the node C which is the public key of the user. The content key 420 encrypted with the public key 4141 of the node C is transmitted to the user apparatus (PC) 10*a* owned by the user.

If the node B is applied to the user apparatus (PC) 10*a* owned by the user, then if the content key encrypted with the public key of the node C cannot be decrypted with the private key of the node B, then the content encrypted with the content key cannot be reproduced on the user apparatus (PC) 10*a*. However, if the link 418 is issued to the node B, then the node B can acquire the private information of the node C based on the information of the link 418. If the user apparatus (PC) 10*a* to which the node B is allocated can acquire the private information of the user to which the node C is allocated, then the user apparatus (PC) 10*a* can decrypt the content key 420 using the private key of the user included in the private information and then decrypt the encrypted content using the content key 420.

If the node A is applied to the user apparatus (PD) 10*d* to which the user apparatus (PC) 10*a* is connected, then the user apparatus (PD) 10*d* can decrypt the encrypted private information of the node B using the key of itself. Further, the user apparatus (PD) 10*d* can decrypt the private information of the node C included in the link 418 with the private key of the node B included in the link 416. The user apparatus (PD) 10*d* to which the node A is allocated and which acquires the private key of the node C can decrypt the encrypted content key 420 with the public key of the node C and then decrypt the encrypted content with the content key 420.

In FIG. 13, the node A is associated with the node B, and the node B is associated with the node C. However, the node A may otherwise be associated directly with the node C. In this instance, link information to be issued to the node A includes the node ID of the node A set as the link source and the node ID of the node C as the link destination. The link information further includes key information obtained by encrypting the private information of the node C with the public key of the node A.

In order for a user who purchases a content to reproduce the content on a user apparatus owned by the user, it is necessary for the user apparatus to acquire information of the user key used to encrypt the content key. Each user apparatus acquires a user key used to encrypt the content key based on link information issued to the user itself and decrypts the content key with the user key.

Where a content key used to encrypt a content is encrypted with the public key of a user and transmitted to a user apparatus owned by the user in this manner, the user apparatus associated with the user can decrypt and reproduce the encrypted content. Even if the content key for encrypting the content is not encrypted with a key unique to each user apparatus to be used for reproduction, it is possible to acquire key information used to encrypt the content key based on the link information and decrypt the content key with the key information. The user apparatus can know with which user the user apparatus itself is associated. In other words, the user apparatus can know, from the link information, of which user the user apparatus can acquire the private information.

The key information included in the links is such as described above. Now, a license issued by the copyright management server 20*a* is described with reference to FIG. 14.

<7. License>

Figure 14:
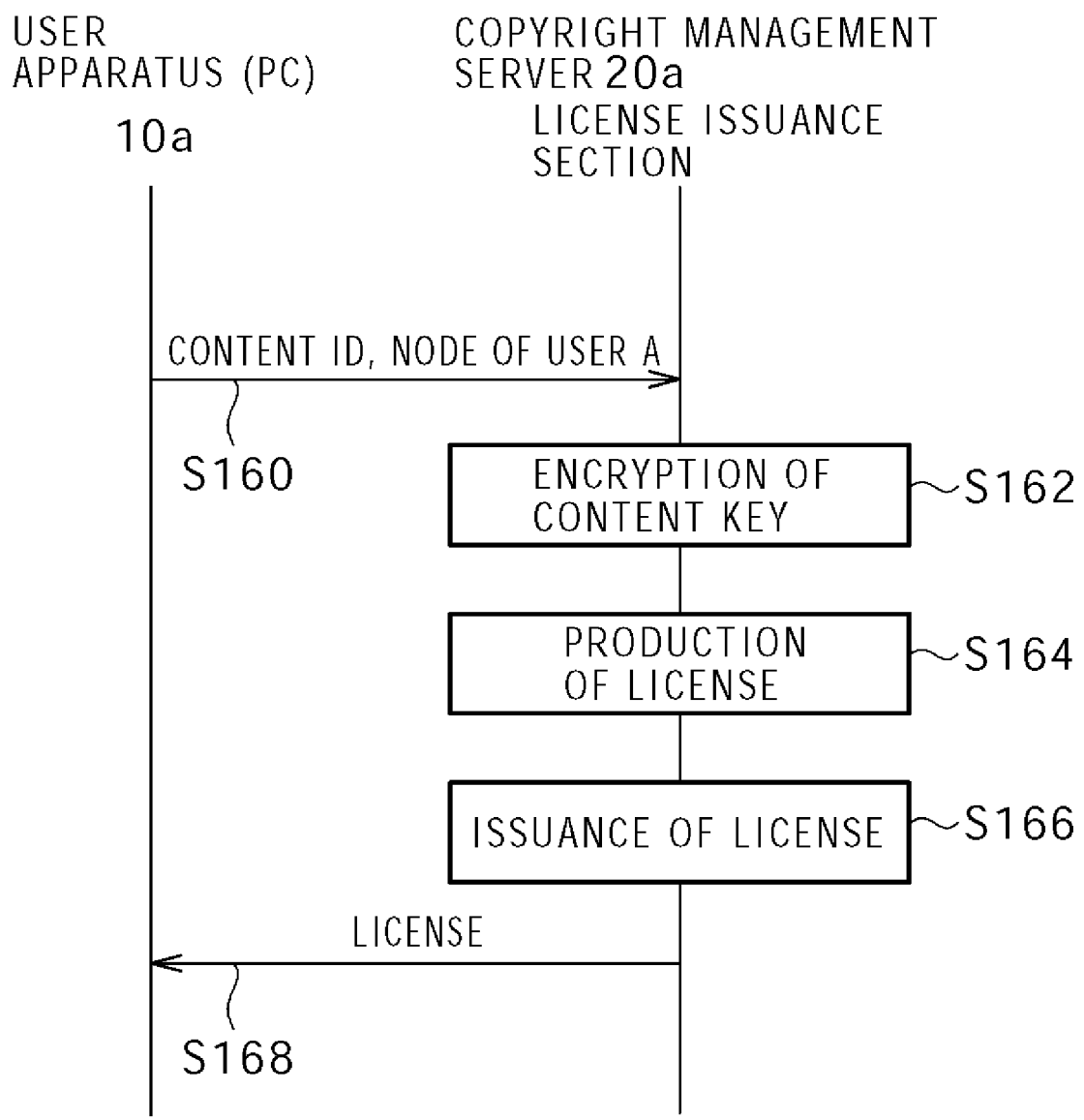
FIG. 14 is a timing chart illustrating a license issuance process of the content providing system of FIG. 1.

FIG. 14 illustrates issuance of a license by the copyright management server 20*a*. A license issued by the copyright management server 20*a* includes information of a content key for decrypting a content purchased by a user and so forth which is necessary to reproduce the content. The content key included in the license is further encrypted with a user key or the like, and a user apparatus or the like which acquires the license can know, from various information included in the license, with which user key the content key is encrypted. If the user apparatus or the like acquiring the license can decrypt the content key based on the link information and so forth described above, then it can reproduce the encrypted content using the content key.

The user apparatus (PC) 10*a* transmits the content ID for uniquely identifying a content and the node information of the user A to the copyright management server 20*a* in order to acquire a license necessary to reproduce the content (step S160). As described hereinabove, if user apparatus owned by the user A are associated with the user A, then a license issued to the user A can be used also by the user apparatus associated with the user A.

The copyright management server 20*a* receiving the content ID and the node information of the user A at step S160 encrypts the content key used to encrypt the content with the public key of the user A (step S162). Then, the copyright management server 20*a* produces a license including the content key encrypted at step S162 (step S164).

Figure 15:
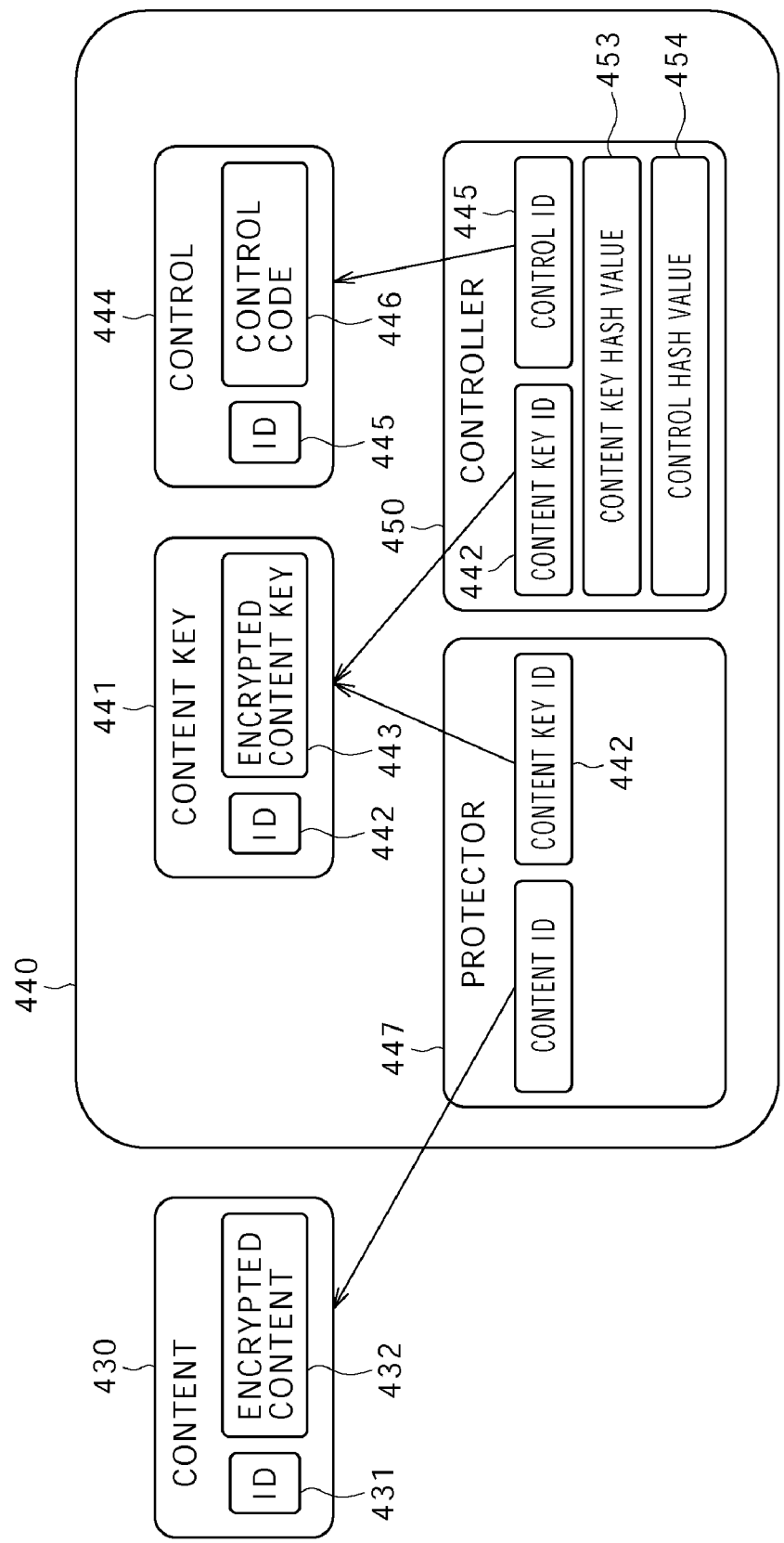
FIG. 15 is a diagrammatic view illustrating the substance of license information used in the content providing system of FIG. 1.

The license produced at step S164 is described with reference to FIG. 15. As seen in FIG. 15, the license 440 includes a content key 441, a control 444, a protector 447, a controller 450 and so forth. The content 430 is encrypted with the content key included in the license 440, and the encrypted content 432 is transmitted from the content providing server 20*b*.

The content key 441 included in the license 440 is in a form encrypted with a key included in the node information transmitted from the user apparatus (PC) 10*a*. For example, if the node information of the user A is transmitted from the user apparatus (PC) 10*a*, then the content key is encrypted with the public key of the user A. The protector 447 includes a content ID which is identification information of a content, and a content key ID which is identification information of a content key. It can be discriminated from the information included in the protector 447 which content should be reproduced using the license 440.

The control 444 includes a control code 446 which is a utilization condition or the like of a content. The control code 446 includes a reproduction term of a content purchased by the user and so forth, and the user would utilize the content within a range of the utilization condition described in the control code 446. The control code 446 may additionally include information representing to which node the license 440 is issued.

A user apparatus which acquires the license 440 refers to the control 444 to decide to which node the license 440 is issued. If a result of the decision indicates that the license 440 is issued to the user associated with the user apparatus, then the user apparatus can utilize the license to reproduce the content.

The controller 450 is information which associates the content key 441 and the control 444 with each other and includes identification information of the content key 441 and identification information of the control 444. Further, in order to decide falsification of the content key 441 and the control 444, the controller 450 may further include a hash value 453 of the content key 441 and a hash value 454 of the control 444. For example, when the license 440 is transmitted from the copyright management server 20*a* to a user apparatus or the like, if the content key 441 included in the license 440 is falsified, then a hash value determined from the content key 441 and a hash value included in the controller 450 become different from each other. Therefore, it can be decided whether or not the content key 441 is falsified. Also falsification of the control 444 can be decided from the hash value 454, and when the license 440 is transmitted, rewriting of utilization conditions of a content and so forth can be found out. The description of the license is completed therewith.

Referring back to FIG. 14, the license produced at step S164 is issued to the user apparatus (PC) 10a (step S116) and transmitted to the user apparatus (PC) 10a (step S168).

The user apparatus (PC) 10a receiving the license at step S168 decodes the content key encrypted with the user key of the user who owns the user apparatus (PC) 10a using the key information included in the link. Then, the user apparatus (PC) 10a can decrypt and reproduce the content encrypted with the content key using the decrypted content key.

Issuance of a license is performed in such a manner as described above.

Now, a concept of a key bunch which a user apparatus has is described with reference to FIG. 16. Each user apparatus has a key bunch necessary to decrypt a content key and uses the key bunch to decrypt an encoded content key.

Figure 16:
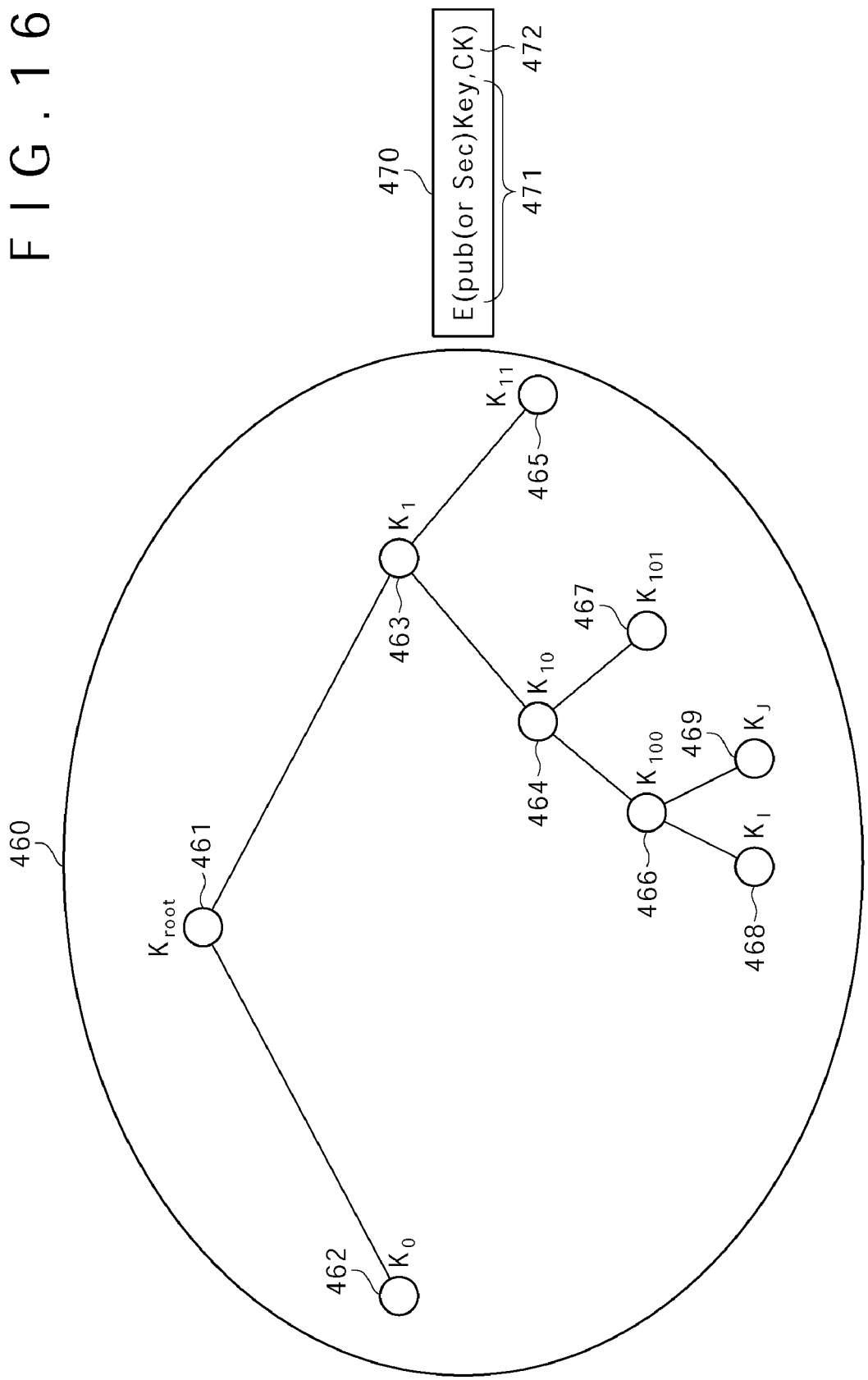
FIG. 16 is a diagrammatic view illustrating a concept of key information used in the content providing system of FIG. 1.

FIG. 16 illustrates a concept of key management in the present embodiment. Each user apparatus in the present embodiment adopts a concept of a tree structure as denoted by reference numeral 460. In particular, the tree structure 460 includes node keys allocated to the individual nodes and including a Kroot key 461 at the top of the tree structure and a K0 key 462, a K1 key 463, a K10 key 464, a K11 key 465, . . . . Further, at the lowermost stage, user keys possessed uniquely by user apparatus I and J are allocated like a KI key 468, another KJ key 469, . . . . Here, it is assumed that each node key is encrypted with a node key immediately below the same in the tree structure. For example, the K1 key 463 is encrypted with the K10 key 464 or the K11 key 465.

On the other hand, a pub (or Sec) Key 471 corresponds to the Kroot key 461. In particular, a content key 472 is encrypted with the Kroot key 461. While, in FIG. 13, a content key is encrypted with the public key of the node C, more particularly it is encrypted with the Kroot key 461.

Here, in order for the user apparatus I to acquire the content key 472 to be used to decrypt a content, a key bunch including the KI key, E(KI key, K100 key), E(K100 key, K10 key), E(K10 key, K1 key), E(K1 key, Kroot key), and E(pub (or Sec) Key, CK) is required. The key bunch is included in the content body.

In this manner, a user apparatus owned by a user can use a key bunch which it has to acquire the Kroot key 461 and decrypt the content key 472.

The copyright management method adopted by the content information providing system 500 is such as described above. Now, a general configuration of the content information providing system 500 is described with reference to FIG. 17.

<8. General Configuration of the Content Information Providing System>

Figure 17:
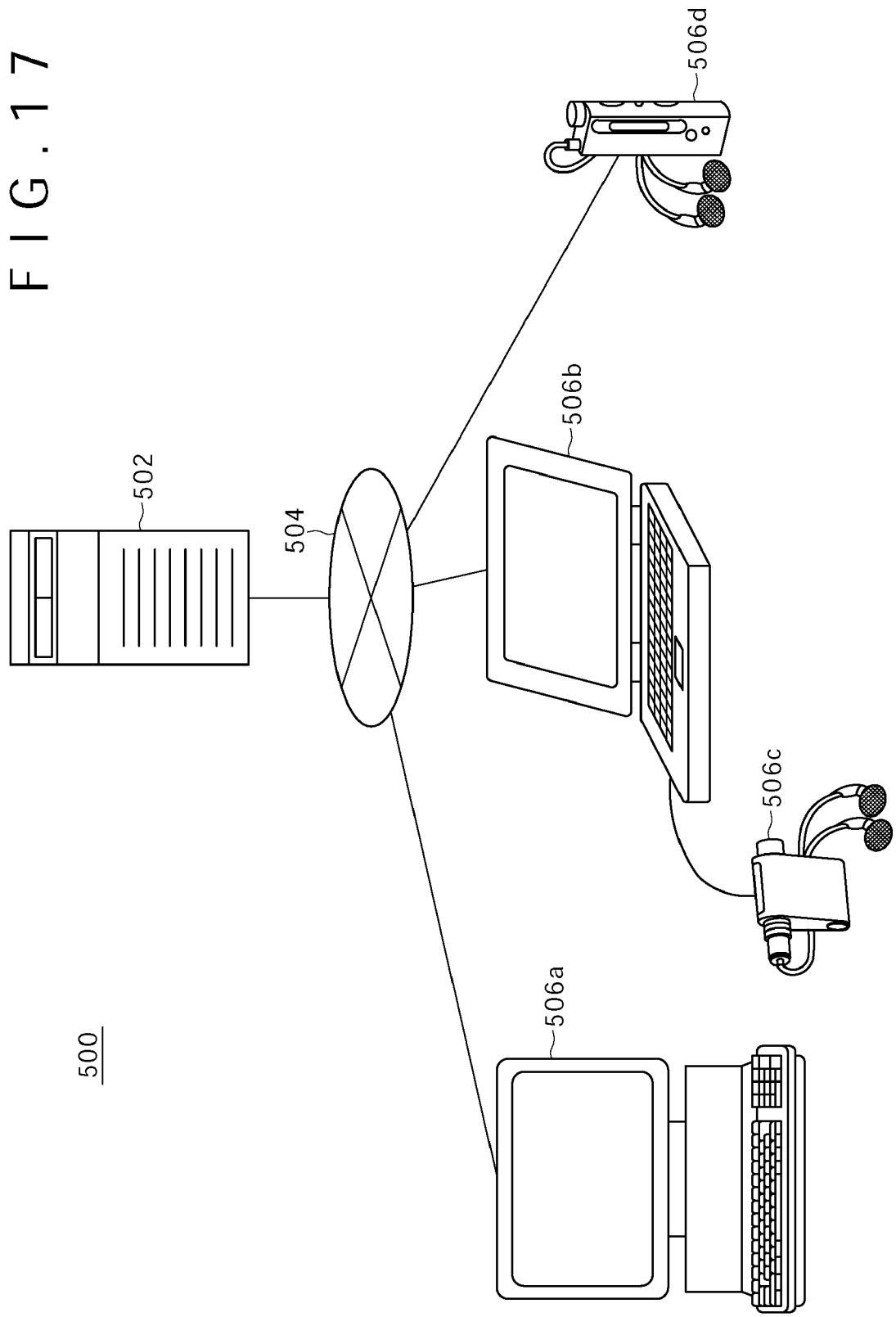
FIG. 17 is a schematic view showing a general configuration of the content information providing system according to the present invention.

As shown in FIG. 17, the content information providing system 500 includes a content information providing server 502, content reproduction apparatus 506a, 506b, 506c and 506d, and a communication network 504.

The content information providing server 502 is a computer which provides content information to the content reproduction apparatus 506a to 506d. The content information includes meta information of a content, a content key and so forth. The content information providing server 502 can transmit a content corresponding to the content information to the content reproduction apparatus 506a to 506d. Further, the content information providing server 502 additionally has the functions of the copyright management server 20a described hereinabove and can perform production, issuance and so forth of link information.

Any of the content reproduction apparatus 506a, 506b, 506c and 506d (hereinafter referred to simply as content reproduction apparatus 506) is a computer which acquires content information from the content information providing server 502, and decodes and reproduces an encrypted content based on the content information. Further, the content reproduction apparatus 506 additionally has the functions of the user apparatus 10 described hereinabove and acquires link information from the content information providing server 502. The content reproduction apparatus 506 may be a personal computer, a PDA (Personal Digital Assistant), a portable device (PD) which is a content reproduction apparatus of the portable type, or the like. The PD more particularly is a portable audio player or the like which includes a hard disk drive (HDD) having a storage capacity of, for example, several tens GB. Or, the PD may be any of various portable apparatus such as portable video/audio players, portable telephone sets, PHS terminals or the like. It is to be noted that the content reproduction apparatus 506 may be a machine for exclusive use for reproduction of a content.

The communication network 504 is a network for communication which interconnects the content information providing server 502 and the content reproduction apparatus 506 for communication therebetween. The communication network 504 may be a public network such as the Internet, a telephone network or a satellite communication network, a dedicated network such as a WAN, a LAN or an IP-VPN, or the like and may be any of a wire network and a wireless network.

The content reproduction apparatus 506 receives and acquires content information from the content information providing server 502 through the communication network 504. However, the content reproduction apparatus 506 need not necessarily have a connection function to the communication network 504. In this instance, the content reproduction apparatus 506 is connected by a USB or the like to a different computer having a connection function to the communication network 504, for example, like the content reproduction apparatus 506c shown in FIG. 17 and acquires content information through the computer. Further, the content reproduction apparatus 506 can receive a content also from the content information providing server 502 through the communication network 504. However, the content reproduction apparatus 506 may receive a content from any computer other than the content information providing server 502 or may acquire a content recorded on a recording medium such as a flexible disk or a CD by reading the recording medium.

Figure 18:
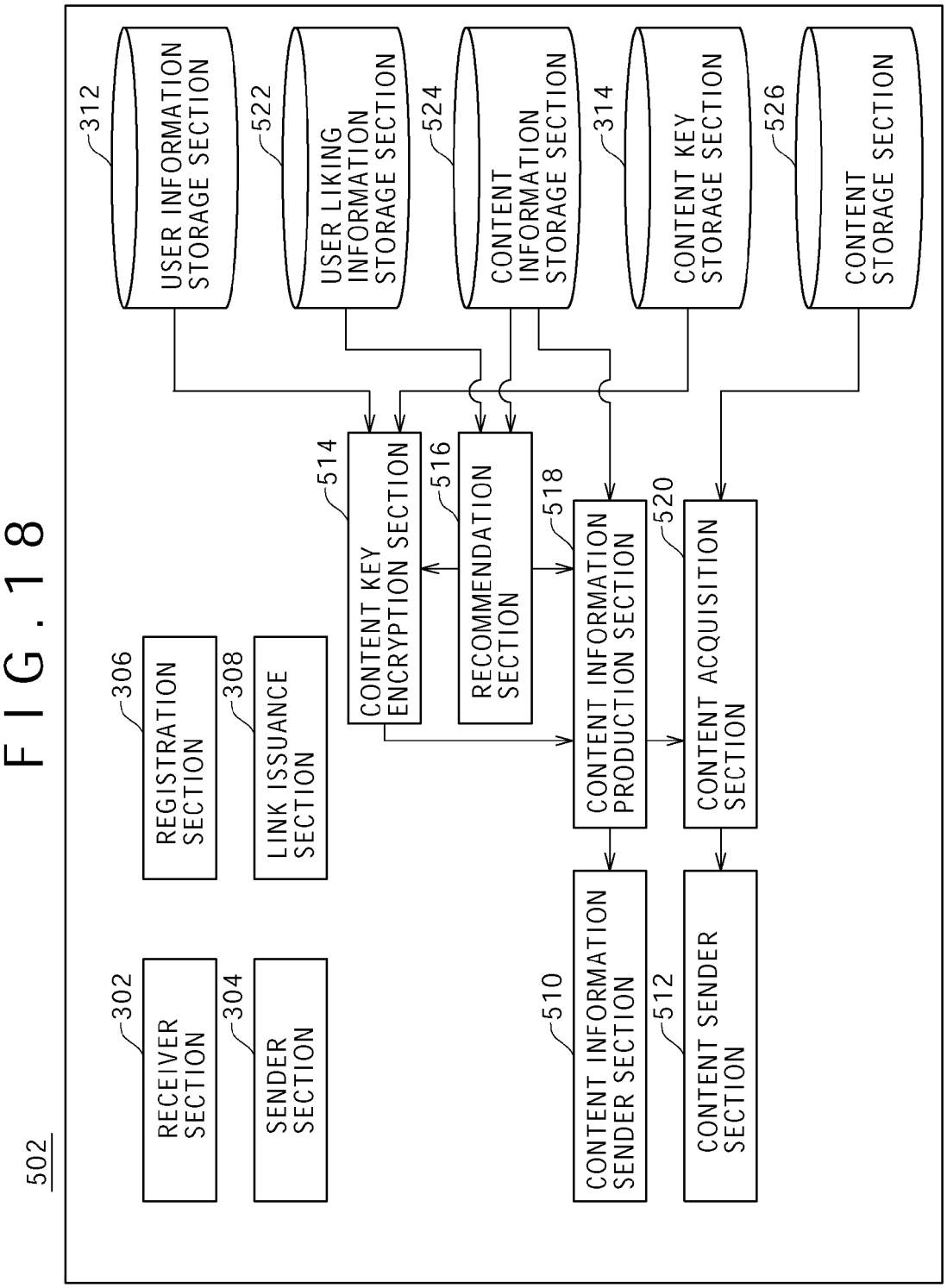
FIG. 18 is a block diagram showing a functional configuration of a content information providing server shown in FIG. 17.

The general configuration of the content information providing system 500 is such as described above. Now, a functional configuration of the content information providing server 502 is described with reference to FIG. 18.

<9. Functional Configuration of the Content Information Providing Server>

The content information providing server 502 includes a receiver section 302, a sender section 304, a registration section 306, a link issuance section 308, a content information sender section 510, and a content sender section 512. The content information providing server 502 further includes a content key encryption section 514, a recommendation section 516, a content information production section 518, a content acquisition section 520, and a user information storage section 312. The content information providing server 502 further includes a user liking information storage section 522, a content information storage section 524, a content key storage section 314, a content storage section 526 and so forth.

The receiver section 302, sender section 304, registration section 306, link issuance section 308, user information storage section 312 and content key storage section 314 have functions substantially similar to those of corresponding components of the copyright management server 20a described hereinabove, and description of them is omitted herein to avoid redundancy.

The user liking information storage section 522 has identification information of users and liking information of the users stored therein in an associated relationship with each other. The user liking information storage section 522 is formed from a RAM, a HDD or the like. The user liking information storage section 522 is described in detail with reference to FIG. 19. In the user liking information storage section 522, a user ID 3121 and liking information of users are associated with each other. The user ID 3121 corresponds to the user ID stored in the user information storage section 312. In the present embodiment, the liking information of a user is characteristic information of music estimated to be preferred by a user specified with the user ID. In particular, the liking information may include a genre 530 of music, a name 532 of an artist and a tempo 534 of music as seen in FIG. 19. Further, the liking information may include an age of music, a tune of music, a name of a composer, a name of a songwriter, a keyword or the like. The liking information can be collected by carrying out a questionnaire to a user and extracting likings of the user from the answer to the questionnaire or by extracting meta information of contents purchased by a user and estimating likings of the user from the extracted meta information.

Referring back to FIG. 18, the content information storage section 524 has identification information of contents and meta information of the contents stored in an associated relationship with each other therein. The meta information of a content is information representative of characteristics of the content. The content information storage section 524 is formed from a RAM, a HDD or the like. The content information storage section 524 is described in detail below with reference to FIG. 20. Referring to FIG. 20, in the content information storage section 524, a content ID 540 and meta information representative of characteristics of contents are associated with each other. The content ID 540 corresponds to the content IDs stored in the content key storage section 314. In the present embodiment, meta information of a content is information representative of characteristics of music obtained by reproduction of a content specified by the content ID 540. In particular, the meta information may include a genre 530 of music, a name 532 of an artist, and a tempo 534 of music as seen in FIG. 20. The meta information may further include a title of music, an age of music, a tune of music, a name of a composer, a name of a songwriter, a keyword or the like.

Description of the functional configuration of the content information providing server 502 is continued referring back to FIG. 18. The recommendation section 516 has a function of selecting a content to be recommended to a user. In particular, the recommendation section 516 acquires liking information of a user from the user liking information storage section 522 and refers to the content information storage section 524 to select contents conforming to the acquired likings to the user. The recommendation section 516 is described in detail below with reference to FIGS. 19 and 20.

The recommendation section 516 acquires liking information of a user of a target of recommendation of a content from the user liking information storage section 522 based on a user ID of the user. For example, where the user ID of the user of the target of recommendation is "Suzuki Jiro", the recommendation section 516 acquires "genre=pops, name of artist=artist name 3, temp=high" as the liking information of the user.

Then, the recommendation section 516 uses the "genre=pops, name of artist=artist name 3, temp=high" as keywords of a search to acquire a content ID associated with meta information corresponding to the keywords from the content information storage section 524. In this instance, only those content IDs which are associated with all of the keywords may be acquired or all of those content IDs which are associated with any one of the keywords may be acquired. In the following description, it is assumed that the latter case is adopted. Thus, the recommendation section 516 acquires C0001, C0002 and C0005 as content IDs which are associated with at least one of the keywords of "genre=pops, name of artist=artist name 3, temp=high". In other words, the recommendation section 516 selects contents individually specified by the content ID=C0001, C0002 and C0005 as contents to be recommended to a user specified by the user ID="Suzuki Jiro".

The recommendation section 516 provides the user ID of the user of the target of recommendation and the content IDs of the selected contents to the content key encryption section 514 and the content information production section 518. It is to be noted that the recommendation section 516 may perform such a recommendation process as described above after every predetermined interval of time such as, for example, after every one week, or at a predetermined point of time such as, for example, at 0 a.m., first day of every month. In this instance, the recommendation section 516 may determine all of the users whose liking information is registered in the user liking information storage section 522 as users of the target of recommendation and perform the recommendation process for each of the users. Alternatively, at a timing at which the content reproduction apparatus 506 is connected to the content information providing server 502, the recommendation section 516 may use the connection as a trigger to perform the recommendation process to the user who uses the thus connected content reproduction apparatus 506.

The content key encryption section 514 encrypts a content key unique to a content to be recommended with a user key unique to a user who is a target of the recommendation. In particular, the content key encryption section 514 acquires a user ID and a content ID from the recommendation section 516, and then acquires a user key associated with the user ID from the user information storage section 312. Then, the content key encryption section 514 acquires a content key associated with the content ID from content key storage section 314 and encrypts the acquired content key with the acquired user key. More particularly, the content key encryption section 514 uses a predetermined rule set as a user key to rearrange digital information (content key) which is a rule for encrypting a content. The content key encryption section 514 provides the encrypted content key to the content information production section 518.

The content information production section 518 produces content information to be provided to a user of a target of recommendation. In particular, the content information production section 518 acquires a user ID and a content ID from the recommendation section 516 and acquires an encrypted content key from the content key encryption section 514. The content information production section 518 acquires meta information such as a title name and an artist name associated with the acquired content ID from the content information storage section 524. Further, the content information production section 518 produces utilization restriction information for a content. The utilization restriction information for a content is information for restricting the reproduction of the content and may be, for example, a reproduction permission time number or a reproduction permission period. Furthermore, the content information production section 518 acquires a device ID coordinated with the acquired user ID from the user information storage section 312. Then, the content information production section 518 provides the content ID, meta information of the content, content key and user ID as content information to the content information sender section 510. The content information production section 518 provides also the device ID acquired as described above to the content information sender section 510 and provides the content ID and the device ID to the content acquisition section 520.

The content information sender section 510 transmits content information to a user of a target of recommendation. In particular, the content information sender section 510 acquires a device ID, a user ID, a content ID, meta information of a content and a content key from the content information production section 518 and transmits the content ID, meta information of the content, content key and user ID to the content reproduction apparatus 506 specified by the device ID.

The content acquisition section 520 acquires a content associated with a content ID acquired from the content information production section 518 from the content storage section 526 and provides the acquired content to the content sender section 512 together with a device ID acquired from the content information production section 518.

The content sender section 512 transmits a content acquired from the content acquisition section 520 to the content reproduction apparatus 506 specified by a device ID acquired from the content acquisition section 520.

By configuring the content information providing server 502 in such a manner as described above, a content selected by the content information providing server 502 can be provided to a user determined by the content information providing server 502 so that the content can be utilized only by the predetermined user. In other words, a content to be trial enjoyed is specified by the content information providing server 502, and also a user who is to trial listen to the content is specified by the content information providing server 502. Then at the timing, a content key unique to the content to be trial listened to is encrypted with a user key unique to the user who is to trial listen to the content. Therefore, the content information providing server 502 need not produce a content encrypted with a user key of each user in advance and store the content.

Figure 24:
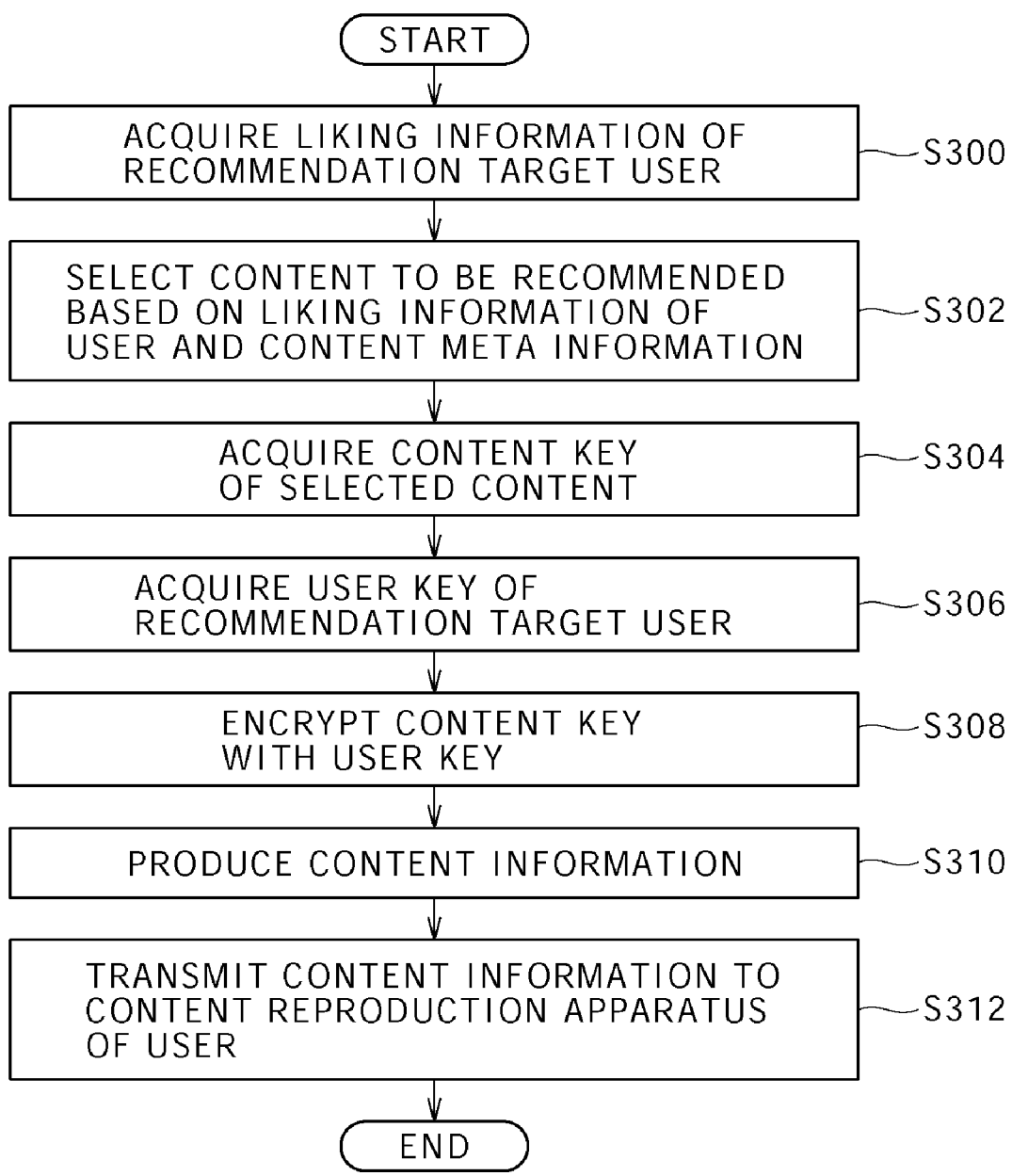
FIG. 24 is a flow chart illustrating a content information providing process by the content information providing server of FIG. 18.

The functional configuration of the content information providing server 502 is such as described above. It is to be noted that, although all of the functions described above may be provided in a single computer to form the content information providing server 502, the content information providing server 502 may otherwise be configured such that the functions are assigned to a plurality of computers and cooperatively function as the content information providing server 502. Now, a flow of a content information providing process performed by the content information providing server 502 is described with reference to FIG. 24.

<10. Flow of the Content Providing Process>

First, the content information providing server 502 acquires liking information of a user of a target of recommendation (step S300). More particularly, the recommendation section 516 acquires liking information of a user of a target of recommendation from the user liking information storage section 522 based on a user ID of the user.

Then, the content information providing server 502 selects a content to be recommended to the user of the target of recommendation (step S302). More particularly, the recommendation section 516 selects a content which is estimated to conform to the likings of the user from the content information storage section 524 based on the liking information acquired at step S300 and acquires a content ID of the content.

Then, the content information providing server 502 acquires a content key of the selected content (step S304). More particularly, the content key encryption section 514 acquires a pertaining content key from the content key storage section 314 based on the content ID designated at step S302.

Then, the content information providing server 502 acquires a user key of the user of the target of recommendation (step S306). More particularly, the content key encryption section 514 acquires a pertaining user key from the user information storage section 312 based on the user ID specified at step S300.

Thereafter, the content information providing server 502 encrypts the content key with the user key (step S308). More particularly, the content key encryption section 514 encrypts the content key acquired at step S304 with the user key acquired at step S306.

Then, the content information providing server 502 produces content information (step S310). More particularly, the content information production section 518 produces content information including the content ID, user ID, encrypted content key and content meta information.

Then, the content information providing server 502 transmits the content information to the content reproduction apparatus of the user (step S312). More particularly, the content information sender section 510 transmits the content information produced at step S310 to the content reproduction apparatus 506 specified by the device ID.

Figure 21:
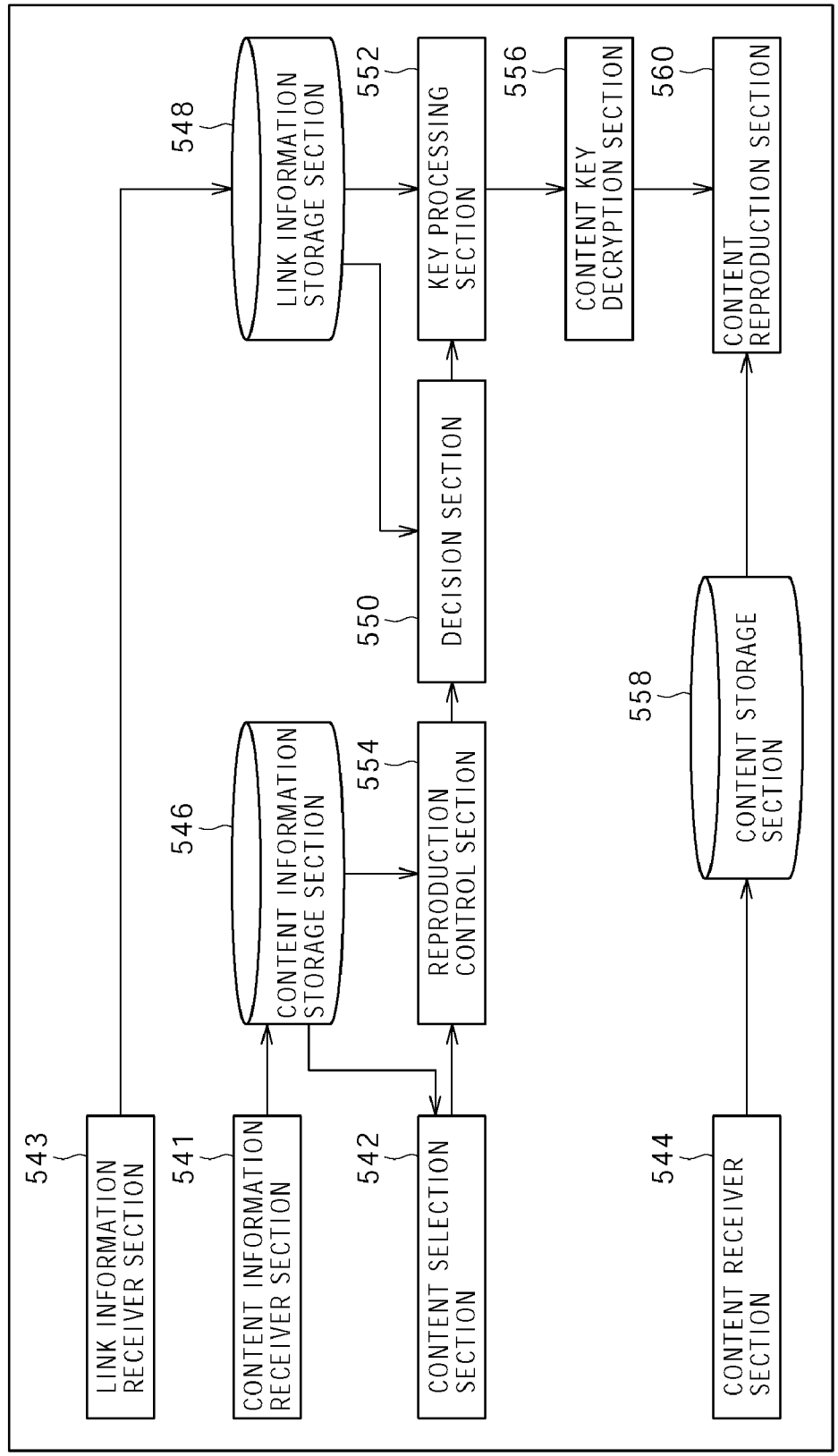
FIG. 21 is a block diagram showing a functional configuration of a content reproduction apparatus shown in FIG. 20.

The flow of the content information providing process executed by the content information providing server 502 is such as described above. Now, a functional configuration of the content reproduction apparatus 506 is described with reference to FIG. 21.

<11. Functional Configuration of the Content Reproduction Apparatus>

The content reproduction apparatus 506 includes a link information receiver section 543, a content information receiver section 541, a content selection section 542, a content receiver section 544, a content information storage section 546, and a link information storage section 548. The content reproduction apparatus 506 further includes a decision section 550, a key processing section 552, a reproduction control section 554, a content key decryption section 556, a content storage section 558, a content reproduction section 560 and so forth.

The link information receiver section 543 receives link information from the content information providing server 502. As described hereinabove, the link information includes a pair of pieces of identification information one of which represents a link source and the other of which represents a link destination. The identification information is identification information (user ID) with which the content information providing server 502 uniquely identifies the user or identification information (device ID) with which the content information providing server 502 uniquely identifies the content reproduction apparatus. The link information further includes information obtained by encrypting a key (user key or device key) unique to a user or a content reproduction apparatus specified by identification information set to the link destination with a key unique to a user or a content reproduction apparatus specified by identification information set to the link source.

The link information storage section 548 stores link information received by the link information receiver section 543. The link information storage section 548 stores the link information to establish an associated relationship between the device ID of a content reproduction apparatus 506 (hereinafter referred to as self apparatus) to which the link information storage section 548 belongs and the user ID of the user who utilizes the self apparatus. More particularly, the link information storage section 548 produces a route whose starting point is the self apparatus and whose arriving point is the user in accordance with the link information stored therein to implement an associated relationship between the self apparatus and the user who uses the self apparatus. Where the route is formed, the content reproduction apparatus 506 can trace the link information to decrypt the user key of the user associated with the self apparatus with the device key unique to the self apparatus.

The content information receiver section 541 receives content information from the content information providing server 502. In particular, the content information receiver section 541 receives content information from the content information providing server 502 through a communication network 504. The content information includes a content ID, meta information of the content, an encrypted content key, a user ID and utilization restriction information. The content information receiver section 541 stores the received content information into the content information storage section 546.

The content information storage section 546 stores content information. The content information storage section 546 is formed from a RAM or a HDD.

The content selection section 542 selects content information stored in the content information storage section 546. In particular, the content selection section 542 includes a display section such as a display unit for displaying meta information of contents included in the content information stored in the content information storage section 546, and an inputting section such as a mouse or a keyboard for being operated by the user to select a desired piece of the meta information. The content selection section 542 supplies the content ID of a content coordinated with the meta information selected by the user to the reproduction control section 554.

The reproduction control section 554 restricts reproduction of a content. The reproduction control section 554 acquires content information in which a content ID acquired from the content selection section 542 is included from the content information storage section 546. Then, the reproduction control section 554 decides, based on utilization restriction information included in the acquired content information, whether or not reproduction of the content selected by the content selection section 542 is permitted. In particular, for example, the reproduction control section 554 stores the number of times of reproduction of each content and compares a reproduction permitting time number included in the utilization restriction information with a reproduction time number stored therein to decide whether or not reproduction of the content may be permitted. Or, the reproduction control section 554 compares reproduction permission date and hour included in the utilization restriction information with the date and hour at present to decide whether or not reproduction of the content may be permitted. If the reproduction control section 554 decides that the content selected by the content selection section 542 cannot be reproduced, then it notifies the user that the content cannot be reproduced using such a message display as "The trial listening period of this content has expired." or the like.

The decision section 550 decides based on the user ID included in the content information and the user ID coordinated with the self apparatus in the link information storage section 548 whether or not it should be performed for the content key decryption section 556 to perform decryption of the content key. In particular, the decision section 550 acquires content information from the reproduction control section 554. Then, the decision section 550 compares the user ID included in the acquired content information with the user ID coordinated with the self apparatus in the link information storage section 548, and if the two user IDs correspond to each other, then the decision section 550 permits a decryption process of the content key by the content key decryption section 556. When a decryption process is to be permitted, the decision section 550 causes the key processing section 552 to start its processing to continue a succeeding process of the content reproduction apparatus 506. On the other hand, if the two user IDs do not correspond to each other, then such error display as "You do not have the right to trial listen to this content." or the like is performed, and the decryption of the content key by the content key decryption section 556 is inhibited. Consequently, the processing does not proceed any more. That the two user IDs correspond to each other is that one of the user ID can be led out from the other user ID in accordance with a predetermined rule and includes a case wherein the two user IDs coincide with each other.

Figure 23:
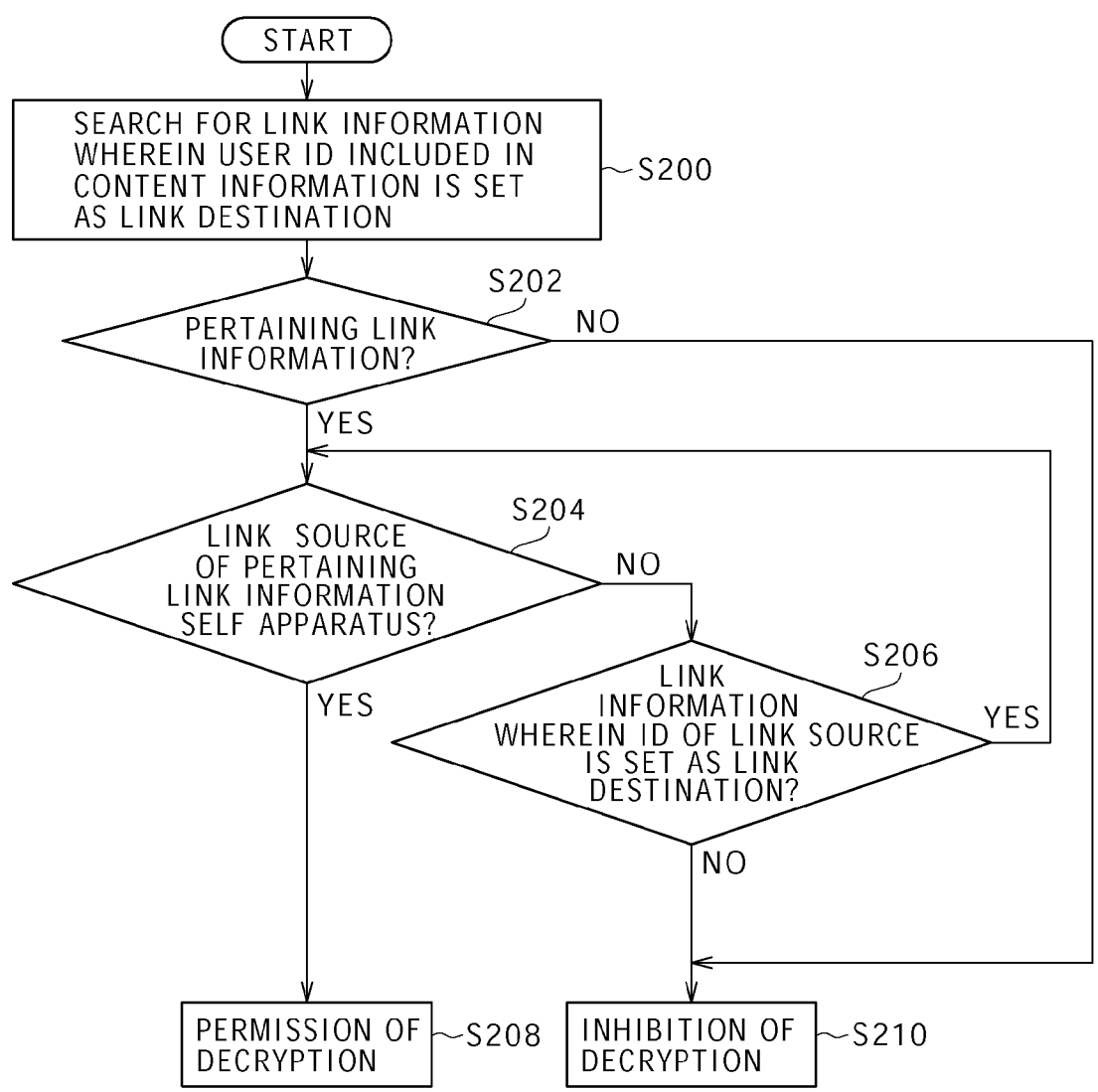
FIG. 23 is a flow chart illustrating a content key decryption permission/inhibition decision process by the content information providing server of FIG. 18.

A particular example of the processing executed by the decision section 550 is described with reference to FIG. 23. First, the decision section 550 checks whether or not the user ID included in the acquired content information is stored in the link information storage section 548. If the user ID is stored in the link information storage section 548, then the decision section 550 checks based on the link information whether or not a route whose start point is the self apparatus and whose arriving point is the user ID is produced in the link information storage section 548. In short, the decision section 550 searches the link information storage section 548 for link information (for example, a link A) with which the user ID included in the content information is set as a link destination (step S200).

If the pertaining link information is found (step S202), then the decision section 550 decides whether or not the identification information set as the link source of the link A is the device ID of the self apparatus (step S204). If the link source of the link A is the device ID of the self apparatus, then the decision section 550 decides that a route whose starting point is the self apparatus and whose arriving point is the user ID is produced and permits a decryption process of the content key by the content key decryption section 556 (step S208).

If the link source of the link A is not the device ID of the self apparatus at step S204, then the decision section 550 searches for different link information (for example, the link B) in which the identification information of the link source of the link A is set as a link destination (step S206). If the pertaining link information is not found, then the decision section 550 decides that a route whose starting point is the self apparatus and whose arriving point is the user ID is not produced as yet and does not permit a decryption process of the content key by the content key decryption section 556 (step S210). On the other hand, if the pertaining link information is found at step S206, then the decision section 550 decides whether or not the identification information set as the link source of the link B is the device ID of the self apparatus (step S204).

If the processes described above are repeated to trace the link information until link information by which the device ID of the self apparatus is set as the link source is stored in the link information storage section 548, then the decision section 550 permits a decryption process of the content key by the content key decryption section 556.

When the decision section 550 permits a decryption process of the content key, it provides the link information specified in the processes described above for producing the route from the self apparatus to the user ID (for example, link A, link B and link C) and the content information acquired from the content information storage section 546 to the key processing section 552.

The key processing section 552 decrypts the user key of the user coordinated with the self apparatus based on the link information stored in the link information storage section 548. In particular, the key processing section 552 acquires the link information from the decision section 550 and first decrypts encrypted information (key) included in the link information (for example, link C) whose link source is the self apparatus with the device key unique to the self apparatus. Then, the key processing section 552 decrypts encrypted information (key) included in link information (for example, link B) wherein the identification information set as the link destination of the link C is set as the link source using the key decrypted immediately before then. The key processing section 552 repeats the process just described to decrypt the encrypted information (that is, user key encrypted with the key of the link source of the link A) included in the link information (for example, link A) which sets the user ID as the link destination. Thereafter, the key processing section 552 provides the decrypted user key and the content information acquired from the decision section 550 to the content key decryption section 556.

The content key decryption section 556 acquires the content information and the user key from the key processing section 552 and decrypts the content key included in the acquired content information with the acquired user key. The content key decryption section 556 provides a content ID included in the content information and the decrypted content key to the content reproduction section 560.

The content reproduction section 560 acquires the content ID and the content key from the content key decryption section 556, acquires a content specified by the acquired content ID, decrypts the content with the content key and reproduces the content.

The reproduction control section 554 receives a content from the content information providing server 502 or another computer or the like and stores the received content into the content storage section 558.

Figure 22:
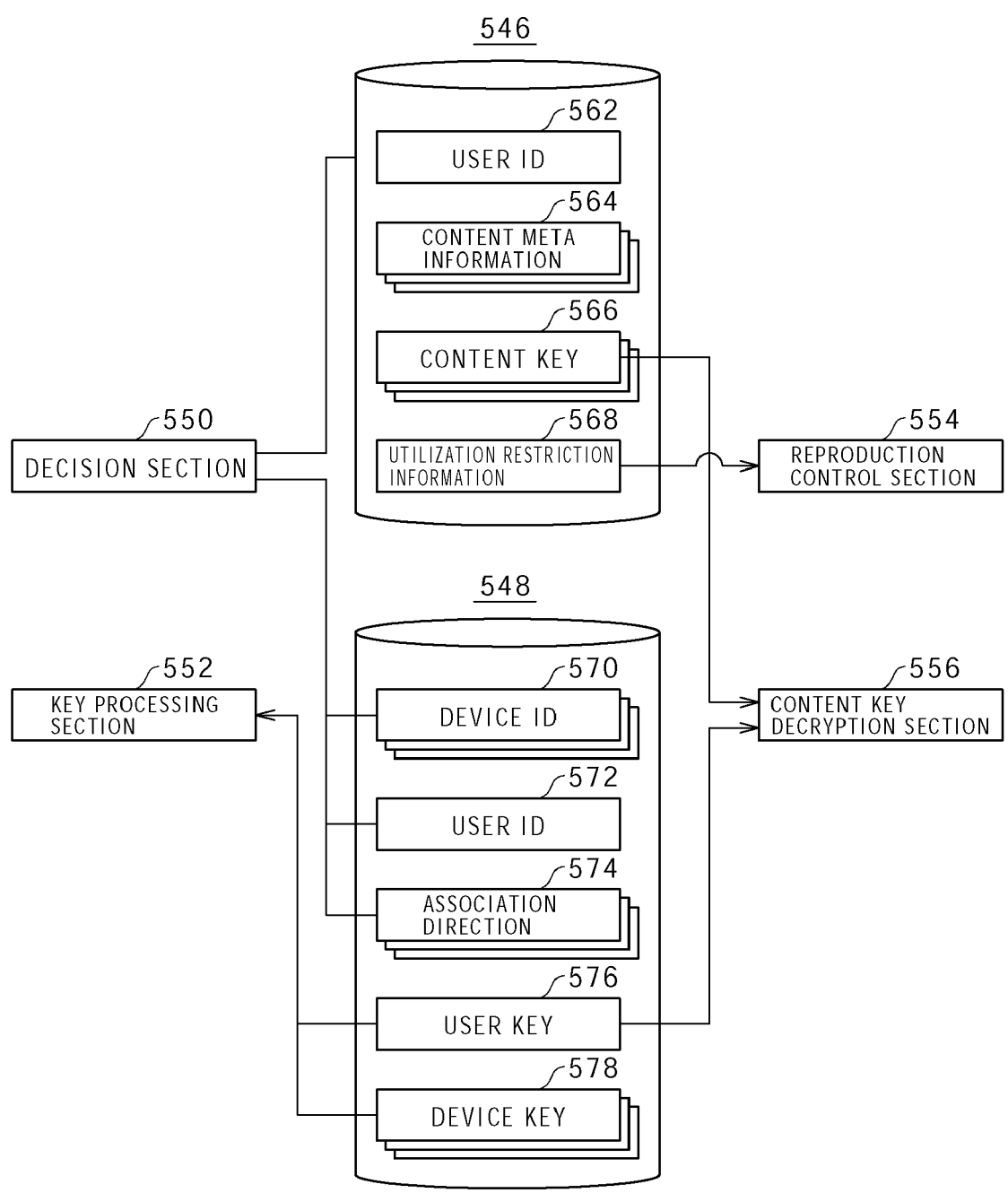
FIG. 22 is a block diagram showing a detailed functional configuration of the content reproduction apparatus of FIG. 21.

Now, which information is used by the processing sections relating to reproduction of a content to perform various processes is described simply with reference to FIG. 22.

Information relating to reproduction of a content in the content reproduction apparatus 506 is stored in the content information storage section 546 and the link information storage section 548. The content information storage section 546 stores one or a plurality of sets of content information each including a user ID 562, at least one piece of content meta information 564, at least one content key 566, utilization restriction information 568 and a content ID (not shown).

The link information storage section 548 stores link information as described hereinabove. Particularly, however, at least one device ID 570, a user ID 572, an association direction 574, a user key 576 and at least one device key 578 are stored in an associated relationship with each other as link information. It is to be noted that the association direction 574 indicates a link source and a link destination included in each piece of the link information.

The decision section 550 performs the decision process described hereinabove using the user ID 562 stored in the content information storage section 546 and the device ID 570, user ID 572 and association direction 574 stored in the link information storage section 548.

The key processing section 552 performs a decryption process of a user key described hereinabove using the user key 576 stored in the link information storage section 548 and the device key 578.

The reproduction control section 554 performs a decision process of whether or not reproduction should be permitted using the utilization restriction information 568 stored in the content information storage section 546.

The content key decryption section 556 performs a decryption process of a content key described hereinabove using the content key 566 stored in the content information storage section 546 and the user key 576 stored in the link information storage section 548.

Figure 25:
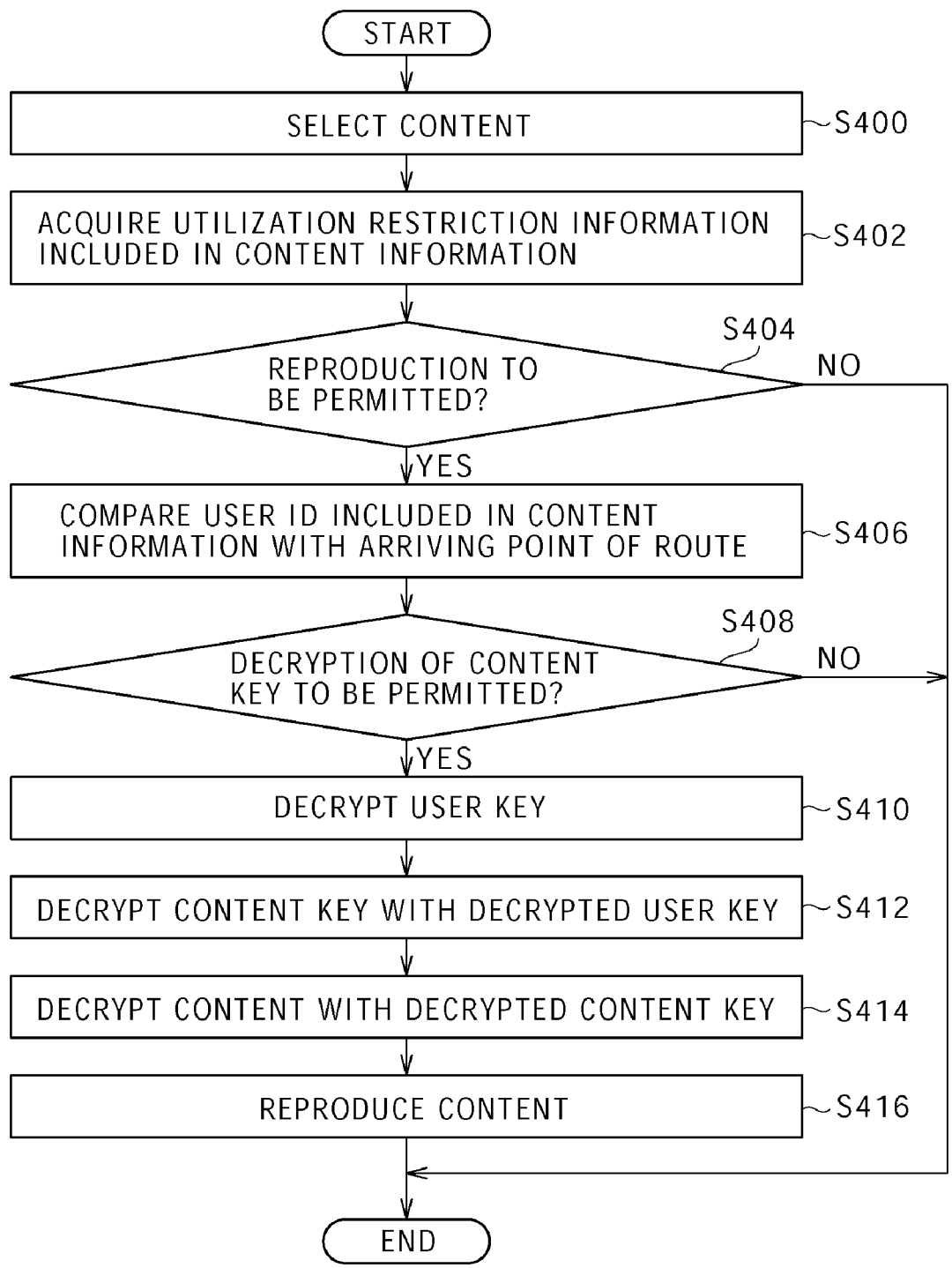
FIG. 25 is a flow chart illustrating a content reproduction process by the content reproduction apparatus shown in FIG. 20.

The functional configuration of the content reproduction apparatus 506 is such as described above. It is to be noted that, although all of the functions described above may be provided in one computer to form a content reproduction apparatus 506, the functions may be distributed to a plurality of computers which generally function as a single content reproduction apparatus 506. Now, a flow of a content reproduction process executed by a content reproduction apparatus 506 is described with reference to FIG. 25.

<12. Flow of the Content Reproduction Process>

The content reproduction apparatus 506 first selects a content to be reproduced (step S400). More particularly, the content reproduction apparatus 506 receives an inputting process by the user, and the content selection section 542 thereof designates a content ID of a content to be reproduced.

Then, the content reproduction apparatus 506 acquires utilization restriction information included in the content information (step S402). More particularly, the reproduction control section 554 acquires utilization restriction information associated with the content information designated at step S400 and including the content ID from the content information storage section 546.

Then, the content reproduction apparatus 506 decides whether or not reproduction of the content should be permitted (step S404). More particularly, the reproduction control section 554 decides based on the utilization restriction information acquired at step S402 whether or not reproduction of the content should be permitted. If a result of the decision is permission of the reproduction, then the processing advances to step S406. On the other hand, when reproduction should not be permitted, the content reproduction apparatus 506 ends the processing without performing reproduction of the content.

At step S406, the content reproduction apparatus 506 compares the user ID included in the content information and the arriving point of the route with each other. More particularly, the decision section 550 compares the user ID included in the content information specified at step S402 and the user ID associated with the self apparatus in the link information storage section 548 with each other.

Then, the content reproduction apparatus 506 decides whether or not decryption of the content key should be permitted (step S408). More particularly, if the two user IDs compared with each other at step S406 coincide with each other, then the decision section 550 permits decryption of the content key, and the processing advances to step S410. On the other hand, if the two user IDs do not coincide with each other, then the decision section 550 does not permit decryption of the content key and ends the processing without performing reproduction of the content.

Thereafter, the content reproduction apparatus 506 decrypts the user key (step S410). More particularly, the key processing section 552 uses the device key of the self apparatus to decrypt the encoded user key stored in the link information storage section 548. It is to be noted that the key processing section 552 uses the device key of a content reproduction apparatus 506 other than the self apparatus stored in the link information storage section 548 for decryption of the user key as occasion demands.

Then, the content reproduction apparatus 506 decrypts the content key (step S412). More particularly, the content key decryption section 556 decrypts the encoded content key included in the content information with the user key decrypted at step S410.

Then, the content reproduction apparatus 506 decrypts the content to be reproduced (step S414). More particularly, the content reproduction section 560 decrypts the encoded content with the content key decrypted at step S412.

Thereafter, the content reproduction apparatus 506 reproduces the content (step S416). More particularly, the content reproduction section 560 reproduces the content decrypted at step S414. The flow of the content reproduction process executed by the content reproduction apparatus 506 is such as described above.

The content information providing system 500 according to the present embodiment provides a content key which can be decrypted only by a content reproduction apparatus linked to a predetermined user of a target of recommendation so that only the user can utilize a predetermined content. In other words, even if a content key leaks to a third party who is not a target of recommendation, the third party cannot decrypt the content key and consequently cannot utilize the content. Therefore, even if a content for sales is utilized as a content for trial listening, the content can be prevented from being utilized by the third party. Further, since reproduction of the content is restricted by utilization restriction information, the content can be prevented from being utilized by a user, who is a target of recommendation and can utilize the content, exceeding the authorized limit of the right. Accordingly, there is no necessity to produce a content for trial listening separately from a content for sales, and a content for sales can be utilized also as a content for trial listening while the copyright of the content is protected.

While a preferred embodiment of the present invention has been described with reference to the accompanying drawings, naturally the present invention is not limited to the specific embodiments. It is apparent that those skilled in the art could make various alterations or modifications within the spirit and scope of the present invention as set forth in the claims, and naturally such alterations and modifications shall fall within the technical scope of the present invention.

For example, while, in the foregoing description, a content to be recommended to a user is selected based on liking information of the user, the present invention is not limited to the specific example. In particular, the content to be recommended may be selected irrespective of the likings of the user, and, for example, the latest content may be recommended.

Further, while, in the foregoing description, a content key is encrypted with a user key unique to a user who is a target of recommendation, the content key may otherwise be encrypted with a device key unique to a content reproduction apparatus to which the content key is to be transmitted. Where the content key is encrypted with a user key, the content can be reproduced by all of apparatus linked to the user. In this instance, even if the utilization restriction information includes a reproduction permission time number set therein, the content can be reproduced by the preset number of times on each (all) of the apparatus, resulting in the possibility that the utilization restriction may be skeletonized. Thus, if the content key is encrypted with a device key, then utilization of the content can be restricted so that the content can be reproduced only by the apparatus designated by the device key, and consequently, the skeletonization of the utilization restriction can be prevented.

The present invention can be applied to a content information providing system which provides a content key to a content reproduction apparatus which decrypts and reproduced an encrypted content.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-transitory computer readable medium storing a computer program for causing a computer to function as a content reproduction apparatus for acquiring a content key from a content information providing server and decrypting and reproducing an encrypted content with the content key, the computer program causing the computer to execute:

a content information reception process for receiving, from said content information providing server, content information including a content key unique to a content to be recommended to a user who is a target of the recommendation, wherein the content key is a same content key used to encrypt a same content to be recommended to another user by the content information providing server, and wherein the content key is encrypted with a user key unique to the user; and a content key decryption process for decrypting the encrypted content key.

2. The non-transitory computer readable medium of claim 1, wherein
   the content key decryption process includes decrypting the encrypted content key received from the content information providing server with the user key stored in the computer functioning as the content reproduction apparatus.

3. The non-transitory computer readable medium of claim 2, wherein the computer program causes the computer to execute:
   a content decryption process for decrypting the content to be recommended received from the content information providing server with the decrypted content key.

4. The non-transitory computer readable medium of claim 1, wherein a content ID of the content to be recommended is uniquely associated with the content key.

5. The non-transitory computer readable medium of claim 1, wherein the user key used to encrypt the content key is unique to the user and different from a user key used to encrypt the same content key for the other user.

6. A content reproduction method for acquiring a content key from a content information providing sever and decrypting and reproducing an encrypted content with the content key, comprising the steps of:
   receiving content information including a content key unique to a content to be recommended to a user who is a target of the recommendation from said content information providing server, wherein the content key is a same content key used to encrypt a same content to be recommended to another user by the content information providing server, and wherein the content key is encrypted with a user key unique to the user; and decrypting the encrypted content key.

7. A content information providing method for providing a content key to a content reproduction apparatus which decrypts and reproduces an encrypted content with the content key, comprising the steps of:

associating identification information of a user who uses said content reproduction apparatus and a user key unique to the user;

associating identification information of contents and content keys unique to the individual contents;

selecting a content to be recommended to the user;

encrypting a content key of the selected content with the user key of the user who is a target of the recommendation, wherein the content key is a same content key used to encrypt a same content to be recommended to another user; and transmitting content information including the content key encrypted with the user key to said content reproduction apparatus used by the user who is a target of the recommendation.

* * * * *